(12) United States Patent
Ige et al.

(10) Patent No.: US 9,057,256 B2
(45) Date of Patent: Jun. 16, 2015

(54) SUBMERSIBLE PUMP CONTROL

(75) Inventors: Adunola Ige, Sugar Land, TX (US);
Obinna Ilochonwu, Saint Cloud (FR);
Arthur I. Watson, Sugar Land, TX
(US); Grant T. Harris, Macae (BR); Ian Roberge, NW Edmonton (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 734 days.

(21) Appl. No.: 13/347,673

(22) Filed: Jan. 10, 2012

(65) Prior Publication Data

US 2013/0175030 A1  Jul. 11, 2013

(51) Int. Cl.
*E21B 43/12* (2006.01)
*G05B 13/04* (2006.01)
*G05B 17/02* (2006.01)

(52) U.S. Cl.
CPC .............. *E21B 43/128* (2013.01); *G05B 17/02* (2013.01); *G05B 13/04* (2013.01)

(58) Field of Classification Search
USPC ........... 700/28, 29, 275, 281, 282; 166/177.7, 166/250.1, 369, 370; 415/17; 417/44.2; 702/9, 33, 182; 706/16, 19
See application file for complete search history.

(56) References Cited

U.S. PATENT DOCUMENTS

| | | | |
|---|---|---|---|
| 6,467,340 B1 * | 10/2002 | Gallagher et al. | ......... 73/152.18 |
| 7,305,306 B2 * | 12/2007 | Venkataramanan et al. | ...... 702/9 |
| 7,869,978 B2 | 1/2011 | Anderson et al. | |
| 8,082,217 B2 | 12/2011 | Crossley et al. | |
| 8,776,617 B2 * | 7/2014 | Durham et al. | ............ 73/862.08 |
| 2003/0015320 A1 * | 1/2003 | Crossley | .................. 166/250.15 |
| 2005/0043921 A1 * | 2/2005 | Zhu et al. | ...................... 702/183 |
| 2005/0273296 A1 * | 12/2005 | Zhu et al. | ...................... 702/181 |
| 2008/0093083 A1 | 4/2008 | Johnson | |
| 2008/0156486 A1 * | 7/2008 | Ciglenec et al. | ............. 166/264 |
| 2008/0236821 A1 | 10/2008 | Fielder | |
| 2009/0044938 A1 * | 2/2009 | Crossley et al. | ......... 166/250.15 |
| 2010/0150737 A1 * | 6/2010 | Anderson et al. | ............ 417/44.1 |
| 2011/0120703 A1 | 5/2011 | Onodera et al. | |
| 2011/0272501 A1 * | 11/2011 | Butler | ............................. 241/15 |
| 2011/0276187 A1 * | 11/2011 | Ciglenec et al. | ............. 700/282 |
| 2012/0065951 A1 * | 3/2012 | Roy et al. | .......................... 703/2 |
| 2012/0325467 A1 * | 12/2012 | Lebel et al. | ................... 166/263 |
| 2013/0278183 A1 * | 10/2013 | Liang et al. | ................ 318/400.2 |
| 2014/0094974 A1 * | 4/2014 | Rashid | .......................... 700/282 |
| 2014/0301869 A1 * | 10/2014 | Durham et al. | ................. 417/63 |

OTHER PUBLICATIONS

International Search Report for the equivalent PCT patent application No. PCT/US2013/021061 issued on Apr. 25, 2013.

* cited by examiner

*Primary Examiner* — Robert Fennema
*Assistant Examiner* — Jennifer L Norton
(74) *Attorney, Agent, or Firm* — Michael Stonebrook

(57) ABSTRACT

A system can include an interface to receive sensed data and economic data; a production control framework that includes a module for modeling motor efficiency of an electric submersible pump, a module for modeling gas composition of a fluid being pumped by an electric submersible pump, a module for modeling solid dynamics in a fluid being pumped by an electric submersible pump, a module to update one or more of the modules for modeling in response to receipt of data via the interface; and an interface to output control commands to a controller for an electric submersible pump based at least in part on data received by the interface and analyzed by the production control framework. Various other apparatuses, systems, methods, etc., are also disclosed.

14 Claims, 14 Drawing Sheets

SUBMERSIBLE PUMP CONTROL

BACKGROUND

Electric submersible pumps (ESPs) may be deployed for any of a variety of pumping purposes. For example, where a substance does not readily flow responsive to existing natural forces, an ESP may be implemented to artificially lift the substance. Costs and operations associated with ESPs can impact overall economics of an application. Various technologies, techniques, etc., described herein can provide for control of submersible pumps such as ESPs.

SUMMARY

A system can include an interface to receive sensed data and economic data; a production control framework that includes a module for modeling motor efficiency of an electric submersible pump, a module for modeling gas composition of a fluid being pumped by an electric submersible pump, a module for modeling solid dynamics in a fluid being pumped by an electric submersible pump, a module to update one or more of the modules for modeling in response to receipt of data via the interface; and an interface to output control commands to a controller for an electric submersible pump based at least in part on data received by the interface and analyzed by the production control framework. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
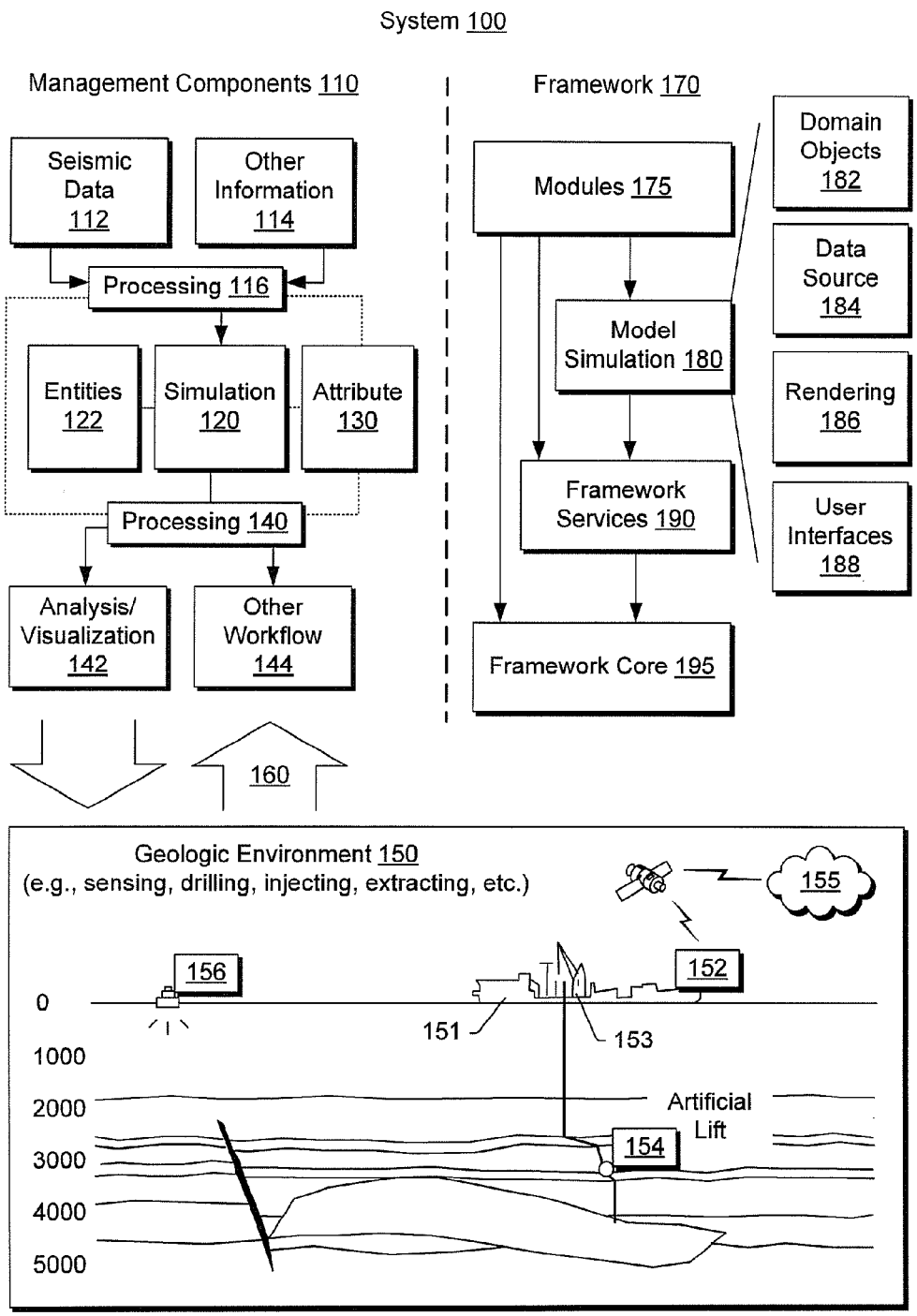
FIG. 1 illustrates an example system that includes various components for simulating and optionally interacting with a geological environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Electric submersible pumps (ESPs) may be deployed for any of a variety of pumping purposes. For example, where a substance does not readily flow responsive to existing natural forces, an ESP may be implemented to artificially lift the substance. Commercially available ESPs (such as the REDA™ ESPs marketed by Schlumberger Limited, Houston, Tex.) may find use in applications that require, for example, pump rates in excess of 4,000 barrels per day and lift of 12,000 feet or more.

ESPs have associated costs, including equipment costs, replacement costs, repair costs, and power consumption costs. Selection of appropriate ESP specifications can be an arduous task, especially given the fact that many factors are dynamic and even stochastic. For example, composition of a pumped substance may vary over time, cost of electrical power may vary over time, entrainment of solids may vary over time, etc. The ability to predict variations in such factors with respect to time may span a spectrum from poor to excellent (e.g., depending on available data, models, etc.). Further, adjusting operation of an ESP for a change in one factor may give rise to unintended consequences. For example, a change in cost of power may give rise to a need to operate a pump motor with greater efficiency, which, in turn, may alter inlet pressure to the pump, which, in turn, may cause a change in phase composition of a substance being pumped, which, in turn, may impact the ability of centrifugal pump stages to lift the substance. Where a change in phase includes an increase in free gas (e.g., approaching 10% by volume), a condition known as gas lock may occur, a form of cavitation that can cause a pump to surge and fail prematurely.

To assist with selection of ESP specifications, a manufacturer may provide a plot with a pump performance curve that defines an optimal operating range for a given pump speed and fluid viscosity. Such a plot may include a head-capacity curve that shows amount of lift per pump stage at a given flow rate, a horsepower requirements curve across a range of flow capacities, and a pump efficiency curve, for example, calculated from head, flow capacity, fluid specific gravity and horsepower. As an example, an ESP may be specified as having a best efficiency point (BEP) of about 77% for a flow of about 7,900 barrels per day, a head of about 49 feet and a horsepower of about 3.69 for a fluid specific gravity of 1.0 (e.g., REDA 538 Series, 1 stage at 3,500 RPM at 60 Hz). An ESP may be specified with a lift per stage such that a number of stages may be selected for an application to meet lift requirements.

Adjustments may be made to an ESP, for example, where the ESP is outfitted with a variable-speed drive (VSD) unit. A VSD unit can include an ESP controller such as, for example, the UniConn™ controller marketed by Schlumberger Limited (Houston, Tex.). In combination, a VSD unit with an ESP controller allows for variations in motor speed to pump optimal rates at variable frequencies, which can better manage power, heat, etc. As to heat generated by a motor, an ESP may rely on flow of pumped fluid for cooling such that a change in motor speed can change steady-state operating temperature of the motor and, correspondingly, efficiency of the motor. Given such relationships, trade-offs can exist, for example, between motor lifetime, power consumption and flow rate.

To improve ESP operations, an ESP may include one or more sensors (e.g., gauges) that measure any of a variety of phenomena (e.g., temperature, pressure, vibration, etc.). A commercially available sensor is the Phoenix MultiSensor™ marketed by Schlumberger Limited (Houston, Tex.), which monitors intake and discharge pressures; intake, motor and discharge temperatures; and vibration and current-leakage. An ESP monitoring system may include a supervisory control and data acquisition system (SCADA). Commercially available surveillance systems include the espWatcher™ and the LiftWatcher™ surveillance systems marketed by Schlumberger Limited (Houston, Tex.), which provides for communication of data, for example, between a production team and well/field data (e.g., with or without SCADA installations). Such a system may issue instructions to, for example, start, stop or control ESP speed via a ESP controller.

As described herein, various technologies, techniques, etc., may be implemented to manage production goals, for example, by being cognizant of factors such as lifting cost (e.g., electricity cost, cost of well treatments, etc.). Various approaches may include maximizing uptime by predicting, detecting and reacting to changing well conditions and extending equipment life through process adjustment.

As an example, a controller may be implemented that controls well operations, including artificial lift using an ESP. Such a controller may include one or more modules that analyze well performance in conjunction with artificial lift. For example, a controller may include or provide access to features of a commercially available modeling framework such as the PIPESIM™ framework marketed by Schlumberger Limited (Houston, Tex.). The PIPESIM™ framework includes features to model multiphase flow from a reservoir to a wellhead, features to account for artificial lift equipment including rod pumps, ESPs and gas lift and features to interlink with reservoir and process simulators such as the ECLIPSE™ reservoir simulation framework marketed by Schlumberger Limited (Houston, Tex.) and the HYSYS process simulator marketed by AspenTech (Burlington, Mass.). The PIPESIM™ framework includes a nodal (e.g., network) model for modeling well flows (e.g., producer, injector, etc.).

As described herein, a controller may be configured to control operations for more than one well. In such an example, the controller may evaluate relationships between wells in a field, optionally via a system of networked controllers. Such a controller may control operations for arrangements where several wells manifold into a common production line. As an example, for wells producing from a given reservoir, the controller may respond to a change in one well to trigger adjustments to one or more operations in the other wells. A controller may include features for integrated asset modeling (e.g., using Avocet™ modules for optimization of gas lift, marketed by Schlumberger Limited, Houston, Tex.). A controller may include adaptive algorithms that interpret well data, a supervisory decision-making engine, well characterization features (e.g., via standardized or other processes), check features to check on limits (e.g., based on learning), etc.

To understand better how well control fits into an overall strategy, examples of processes are described below as applied to basins and, for example, production from one or more reservoirs in a basin.

FIG. 1 shows an example of a system 100 that includes various management components 110 to manage various aspects of a geologic environment 150 such as a basin that may include one or more reservoirs. For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the geologic environment 150 may be outfitted with any of a variety of sensors, detectors, actuators, ESPs, etc. For example, equipment 152 may include communication circuitry to receive and to transmit information with respect to one or more networks 155. Such information may include information associated with downhole equipment 154 (e.g., an ESP), which may include equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc.

As to the management components 110 of FIG. 1, these may include a seismic data component 112, an information component 114, a pre-simulation processing component 116, a simulation component 120, an attribute component 130, a post-simulation processing component 140, an analysis/visualization component 142 and a workflow component 144. In operation, seismic data and other information provided per the components 112 and 114 may be input to the simulation component 120, optionally with pre-simulation processing via the processing component 116 and optionally with post-simulation processing via the processing component 140.

According to an embodiment, the simulation component 120 may rely on entities 122. Entities 122 may be earth entities or geological objects such as wells, surfaces, reservoirs, etc. In the system 100, the entities 122 may include virtual representations of actual physical entities that are reconstructed for purposes of simulation. The entities 122 may be based on data acquired via sensing, observation, etc. (e.g., the seismic data 112 and other information 114).

According to an embodiment, the simulation component 120 may rely on a software framework such as an object-based framework. In such a framework, entities may be based on pre-defined classes to facilitate modeling and simulation. A commercially available example of an object-based framework is the MICROSOFT™.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may be a library of attributes. Such processing may occur prior to input to the simulation component 120. Alternatively, or in addition to, the simulation component 120 may perform operations on input information based on one or more attributes specified by the attribute component 130. According to an embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. Additionally, or alternatively, output from the simulation component 120 may be input to one or more other workflows, as indicated by a workflow component 144. Further, dotted lines indicate possible feedback within the management components 110. For example, feedback may occur between the analysis/visualization component 142 and either one of the processing components 116 and 140.

According to an embodiment, the management components 110 may include features of a commercially available simulation framework such as the PETREL™ seismic to simulation software framework (Schlumberger Limited, Houston, Tex.). The PETREL™ framework provides components that allow for optimization of exploration and development operations. The PETREL™ framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

According to an embodiment, the management components 110 may include features for geology and geological modeling to generate high-resolution geological models of reservoir structure and stratigraphy (e.g., classification and estimation, facies modeling, well correlation, surface imaging, structural and fault analysis, well path design, data analysis, fracture modeling, workflow editing, uncertainty and optimization modeling, petrophysical modeling, etc.). As to reservoir engineering, for a generated model, one or more features may allow for simulation workflow to perform streamline simulation, reduce uncertainty and assist in future well planning (e.g., uncertainty analysis and optimization workflow, well path design, advanced gridding and upscaling, history match analysis, etc.). The management components 110 may include features for drilling workflows including well path design, drilling visualization, and real-time model updates (e.g., via real-time data links).

According to an embodiment, various aspects of the management components 110 may be add-ons or plug-ins that operate according to specifications of a framework environment. For example, a commercially available framework environment marketed as the OCEAN™ framework environment (Schlumberger Limited, Houston, Tex.) allows for seamless integration of add-ons (or plug-ins) into a PETREL™ framework workflow. The OCEAN™ framework environment leverages .NET™ tools (Microsoft Corporation, Redmond, Wash.) and offers stable, user-friendly interfaces for efficient development. According to an embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may be the commercially available OCEAN™ framework where the model simulation layer 180 is the commercially available PETREL™ model-centric software package that hosts OCEAN™ framework applications. According to an embodiment, the PETREL™ software may be considered a data-driven application.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for all application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

The PETREL™ framework can integrate multidisciplinary workflows surrounding ECLIPSE™ simulation modules, for example, to provide transparent data flows and an intuitive graphical user interface. Modules may include the ECLIPSE™ blackoil simulation module for three-phase, 3D reservoir simulation with extensive well controls, field operations planning, and comprehensive enhanced oil recovery (EOR) schemes; the ECLIPSE™ compositional simulation module for reservoir fluid phase behavior and compositional changes, when modeling multicomponent hydrocarbon flow; the ECLIPSE™ FrontSim™ simulation module for modeling multiphase fluid flow along streamlines, supporting both geological model screening and pattern flood management; the ECLIPSE™ thermal simulation module for support of a wide range of thermal recovery processes, including steam-assisted gravity drainage, cyclic steam operations, toe-to-heel air injection, and cold heavy oil production with sand; and one or more other modules such as a coalbed methane module, an advanced well module, etc. As described herein, an ESP controller may optionally provide for access to one or more frameworks (e.g., PETREL™, ECLIPSE™, PIPESIM™, etc.).

In the example of FIG. 1, as indicated, the management components 110 may receive information (see, e.g., the feedback 160) from the geologic environment 150. As an example, the downhole equipment 154 may include an ESP outfitted with one or more sensors that transmit data as, for example, the other information 114. In turn, one or more of the management components 110 may process the data to provide instructions to the geologic environment 150, for example, to adjust one or more operational parameters that may impact operation of the downhole equipment 154 (e.g., an ESP). As shown in FIG. 1, transmission of information may occur via one or more networks. Further, information from other geologic environments, other downhole equipment, etc., may be transmitted to one or more of the management components 110.

Figure 2:
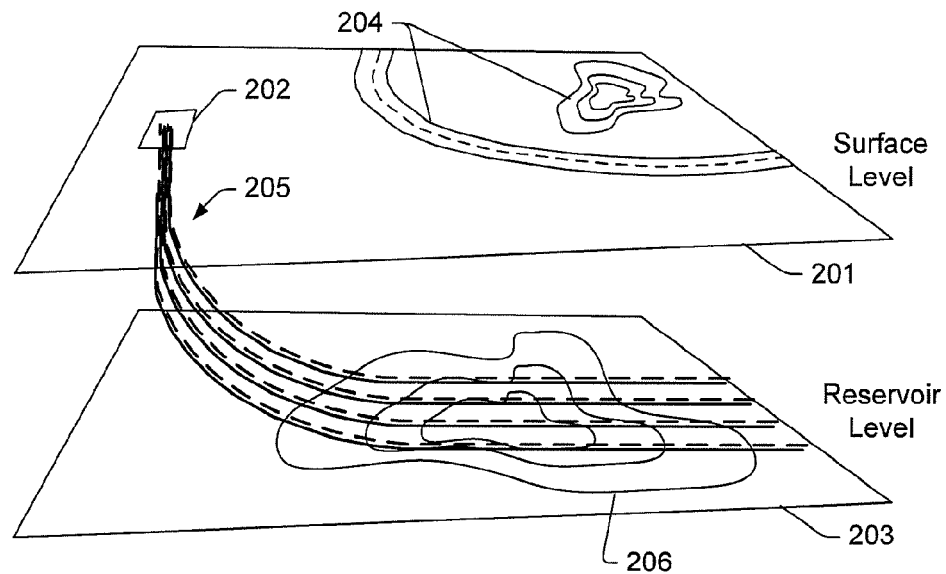
FIG. 2 illustrates an example of geologic environment that includes steam injection and artificial lift.
Figure 2:
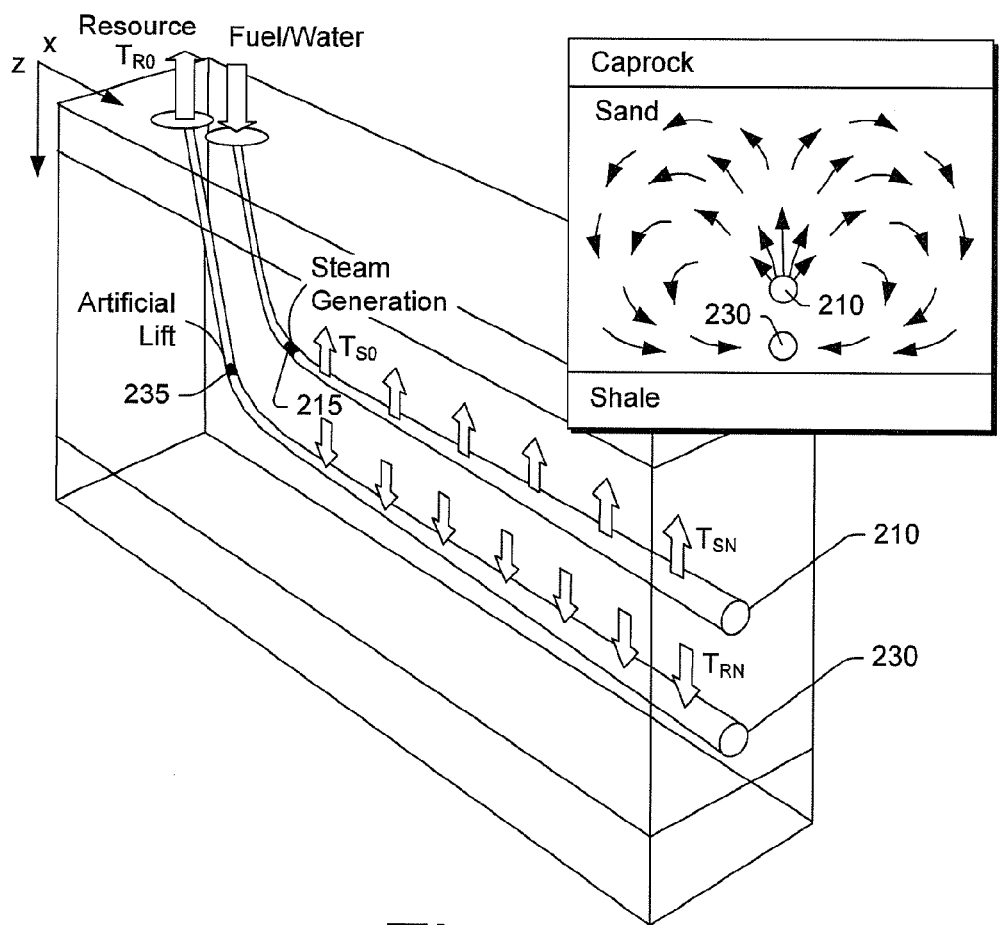

FIG. 2 shows an example of a geologic environment 200 (e.g., a basin) being defined, for example, as including a surface level 201 (e.g., upper surface or layer) and a reservoir level 203 (e.g., lower surface or layer). As shown in FIG. 2, a structure 202 may be placed (e.g., built) on the surface level 201 for drilling or operating subsurface equipment 205 for exploring, injecting, extracting, etc. Further, placement of the structure 202 may need to account for various constraints such as roads, soil conditions, etc. As shown, the structure 202 may be, for example, a pad for a rig or rigs (e.g., to drill, to place equipment, to operate equipment, etc.).

In the example of FIG. 2, the equipment 205 may be steam assisted gravity drainage (SAGD) equipment for injecting steam and extracting resources from a reservoir 206. For example, a SAGD operation can include a steam-injection well 210 and a resource production well 230. In the example of FIG. 2, a downhole steam generator 215 generates steam in the injection well 210, for example, based on supplies of water and fuel from surface conduits, and artificial lift equipment 235 (e.g., ESP, etc.) may be implemented to facilitate resource production. While a downhole steam generator is shown, steam may be alternatively, or additionally, generated at the surface level. As illustrated in a cross-sectional view, the steam rises in the subterranean portion. As the steam rises, it transfers heat to a desirable resource such as heavy oil. As the resource is heated, its viscosity decreases, allowing it to flow more readily to the resource production well 230.

As illustrated in the example of FIG. 2, SAGD is a technique that involves subterranean delivery of steam to enhance flow of heavy oil, bitumen, etc. SAGD can be applied for Enhanced Oil Recovery (EOR), which is also known as tertiary recovery because it changes properties of oil in situ.

With respect to extraction, SAGD may result in condensed steam from an upper well may accompany oil to a lower well, which can impact artificial lift (e.g., ESP) operations and increase demands on separation processing where it is desirable to separate one or more components from the oil and water mixture.

As to the downhole steam generator 215, it may be fed by three separate streams of natural gas, air and water where a gas-air mixture is combined first to create a flame and then the water is injected downstream to create steam. In such an example, the water can also serve to cool a burner wall or walls (e.g., by flowing in a passageway or passageways within a wall).

The example of FIG. 2 demonstrates how operation of a steam generator or, more generally, steam injection, may impact operation of downhole equipment such as an ESP. Referring to the example of FIG. 1, the management components 110 may receive information (see, e.g., the feedback 160) from the geologic environment 150; similarly, the management components 110 may apply to the geologic environment 200 of FIG. 2, for example, where the equipment 215, the equipment 235 or both may transmit data as, for example, the other information 114. In turn, one or more of the management components 110 may process the data to provide instructions to the environment 200, for example, to adjust one or more operational parameters that may impact operation of the equipment 215, the equipment 235 (e.g., an ESP), or other equipment. As shown in FIG. 1, transmission of information may occur via one or more networks. Further, information from other geologic environments, other downhole equipment, etc., may be transmitted to one or more of the management components 110.

Figure 3:
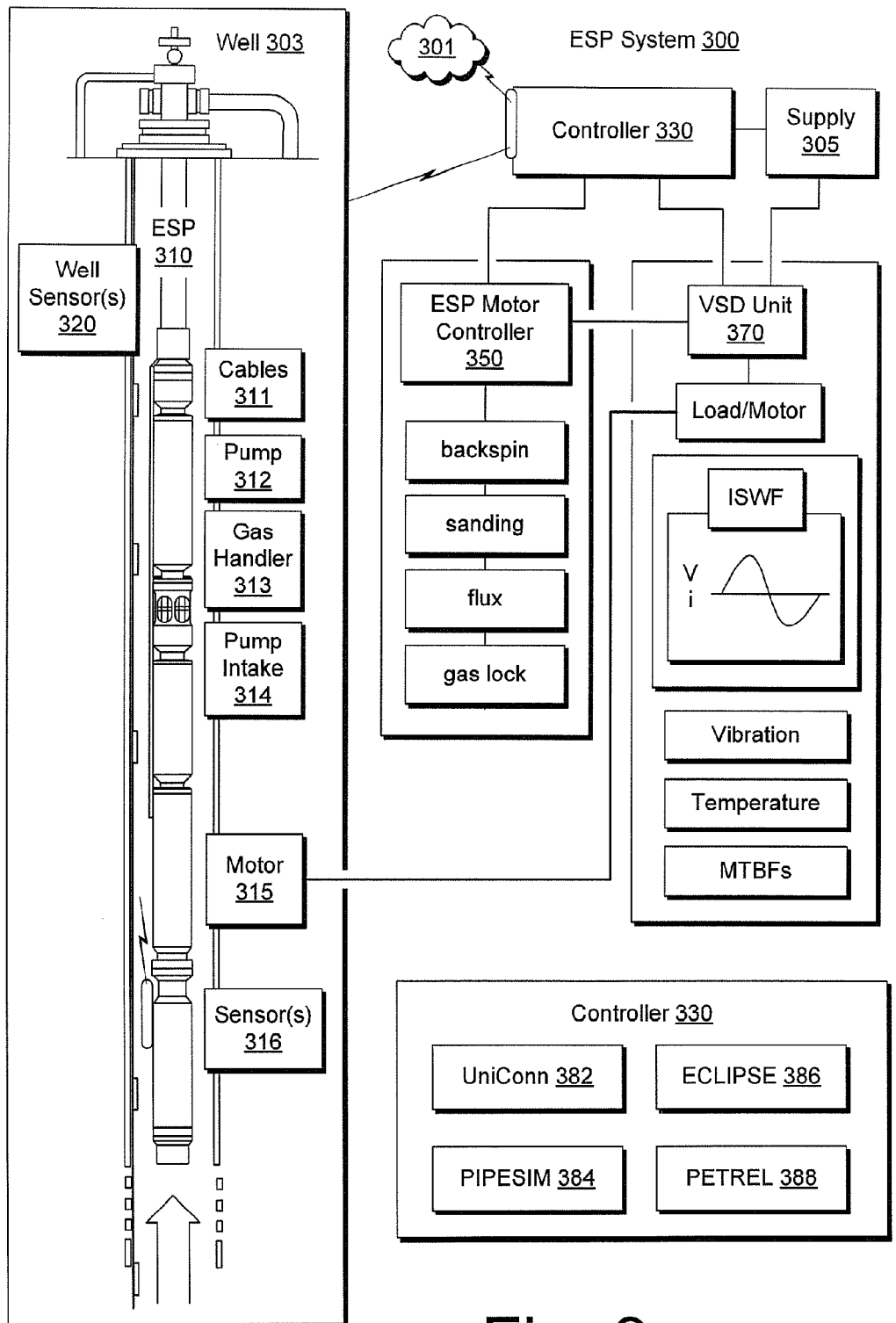
FIG. 3 illustrates an example of an electric submersible pump system.

FIG. 3 shows an example of an ESP system 300 as including a network 301, a well 303 disposed in a geologic environment, a power supply 305, an ESP 310, a controller 330, a motor controller 350 and a VSD unit 370. The power supply 305 may receive power from a power grid, an onsite generator (e.g., natural gas driven turbine), or other source. The power supply 305 may supply a voltage, for example, of about 4.16 kV.

The well 303 includes a wellhead that can include a choke (e.g., a choke valve). For example, the well 303 can include a choke valve to control various operations such as to reduce pressure of a fluid from high pressure in a closed wellbore to atmospheric pressure. Adjustable choke valves can include valves constructed to resist wear due to high-velocity, solids-laden fluid flowing by restricting or sealing elements. A wellhead may include one or more sensors such as a temperature sensor, a pressure sensor, a solids sensor, etc.

The ESP 310 includes cables 311, a pump 312, gas handling features 313, a pump intake 314, a motor 315 and one or more sensors 316 (e.g., temperature, pressure, current leakage, vibration, etc.). The well 303 may include one or more well sensors 320, for example, such as the commercially available OpticLine™ sensors or WellWatcher BriteBlue™ sensors marketed by Schlumberger Limited (Houston, Tex.). Such sensors are fiber-optic based and can provide for real time sensing of temperature, for example, in SAGD or other operations. As shown in the example of FIG. 2, a well can include a relatively horizontal portion. Such a portion may collect heated heavy oil responsive to steam injection. Measurements of temperature along the length of the well can provide for feedback, for example, to understand conditions downhole of an ESP. Well sensors may extend thousands of feet into a well (e.g., 4,000 feet or more) and beyond a position of an ESP.

The controller 330 can include one or more interfaces, for example, for receipt, transmission or receipt and transmission of information with the motor controller 350, a VSD unit 370, the power supply 305 (e.g., a gas fueled turbine generator, a power company, etc.), the network 301, equipment in the well 303, equipment in another well, etc.

As shown in FIG. 3, the controller 330 can include or provide access to one or more modules or frameworks. Further, the controller 330 may include features of an ESP motor controller and optionally supplant the ESP motor controller 350. For example, the controller 330 may include the UniConn™ motor controller 382 marketed by Schlumberger Limited (Houston, Tex.). In the example of FIG. 3, the controller 330 may access one or more of the PIPESIM™ framework 384, the ECLIPSE™ framework 386 and the PETREL™ framework 388.

In the example of FIG. 3, the motor controller 350 may be a commercially available motor controller such as the UniConn™ motor controller. The UniConn™ motor controller can connect to a SCADA system, the espWatcher™ surveillance system, etc. The UniConn™ motor controller can perform some control and data acquisition tasks for ESPs, surface pumps or other monitored wells. The UniConn™ motor controller can interface with the Phoenix™ monitoring system, for example, to access pressure, temperature and vibration data and various protection parameters as well as to provide direct current power to downhole sensors. The UniConn™ motor controller can interface with fixed speed drive (FSD) controllers or a VSD unit, for example, such as the VSD unit 370.

For FSD controllers, the UniConn™ motor controller can monitor ESP system three-phase currents, three-phase surface voltage, supply voltage and frequency, ESP spinning frequency and leg ground, power factor and motor load.

For VSD units, the UniConn™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

The UniConn™ motor controller can include control functionality for VSD units such as target speed, minimum and maximum speed and base speed (voltage divided by frequency); three jump frequencies and bandwidths; volts per hertz pattern and start-up boost; ability to start an ESP while the motor is spinning; acceleration and deceleration rates, including start to minimum speed and minimum to target speed to maintain constant pressure/load (e.g., from 0.01 Hz/10,000 s to 1 Hz/s); stop mode with PWM carrier frequency; base speed voltage selection; rocking start frequency, cycle and pattern control; stall protection with automatic speed reduction; changing motor rotation direction without stopping; speed force; speed follower mode; frequency control to maintain constant speed, pressure or load; current unbalance; voltage unbalance; overvoltage and undervoltage; ESP backspin; and leg-ground.

In the example of FIG. 3, the ESP motor controller 350 includes various modules to handle, for example, backspin of an ESP, sanding of an ESP, flux of an ESP and gas lock of an ESP. As mentioned, the motor controller 350 may include any of a variety of features, additionally, alternatively, etc.

In the example of FIG. 3, the VSD unit 370 may be a low voltage drive (VSD) unit, a medium voltage drive (MVD) unit or other type of unit. For a LVD, a VSD unit can include a step-up transformer, control circuitry and a step-up transformer while, for a MVD, a VSD unit can include an integrated transformer and control circuitry. As an example, the VSD unit 370 may receive power with a voltage of about 4.16 kV and control a motor as a load with a voltage from about 0 V to about 4.16 kV.

The VSD unit 370 may include commercially available control circuitry such as the SpeedStar™ MVD control circuitry marketed by Schlumberger Limited (Houston, Tex.). The SpeedStar™ MVD control circuitry is suitable for indoor or outdoor use and comes standard with a visible fused disconnect switch, precharge circuitry, and sine wave output filter (e.g., integral sine wave filter, ISWF) tailored for control and protection of high-horsepower ESPs. The SpeedStar™ MVD control circuitry can include a plug-and-play sine wave output filter, a multilevel PWM inverter output, a 0.95 power factor, programmable load reduction (e.g., soft-stall function), speed control circuitry to maintain constant load or pressure, rocking start (e.g., for stuck pumps resulting from scale, sand, etc.), a utility power receptacle, an acquisition system for the Phoenix™ monitoring system, a site communication box to support surveillance and control service, a speed control potentiometer. The SpeedStar™ MVD control circuitry can optionally interface with the UniConn™ motor controller, which may provide some of the foregoing functionality.

In the example of FIG. 3, the VSD unit 370 is shown along with a plot of a sine wave (e.g., achieved via a sine wave filter that includes a capacitor and a reactor), responsiveness to vibration, responsiveness to temperature and as being managed to reduce mean time between failures (MTBFs). The VSD unit 370 may be rated with an ESP to provide for about 40,000 hours (5 years) of operation at a temperature of about 50 C with about a 100% load. The VSD unit 370 may include surge and lightening protection (e.g., one protection circuit per phase). With respect to operational cost, as an example, for a 373 kW load, an increase in efficiency of about 0.5% may translate into about $1,000 per year in power savings (e.g., depending on cost of power). As to leg-ground monitoring or water intrusion monitoring, such types of monitoring can indicate whether corrosion is or has occurred. Further monitoring of power quality from a supply, to a motor, at a motor, may occur by one or more circuits or features of a controller.

Overall system efficiency can affect power supply from the utility or generator. As described herein, monitoring of ITHD, VTHD, PF and overall efficiency may occur (e.g., surface measurements). Such surface measurements may be analyzed in separately or optionally in conjunction with a pump curve. VSD unit related surface readings (e.g., at an input to a VSD unit) can optionally be input to an economics model. For example, the higher the PF and therefore efficiency (e.g., by running an ESP at a higher frequency and at close to 100% load), the less harmonics current (lower ITHD) sensed by the power supply. In such an example, well operations can experience less loses and thereby lower energy costs for the same load.

While the example of FIG. 3 shows an ESP with centrifugal pump stages, another type of ESP may be controlled. For example, an ESP may include a hydraulic diaphragm electric submersible pump (HDESP), which is a positive-displacement, double-acting diaphragm pump with a downhole motor. HDESPs find use in low-liquid-rate coalbed methane and other oil and gas shallow wells that require artificial lift to remove water from the wellbore. A HDESP can be set above or below the perforations and run in wells that are, for example, less than about 2,500 ft deep and that produce less than about 200 barrels per day. HDESPs may handle a wide variety of fluids and, for example, up to about 2% sand, coal, fines and $H_2S/CO_2$.

Figure 4:
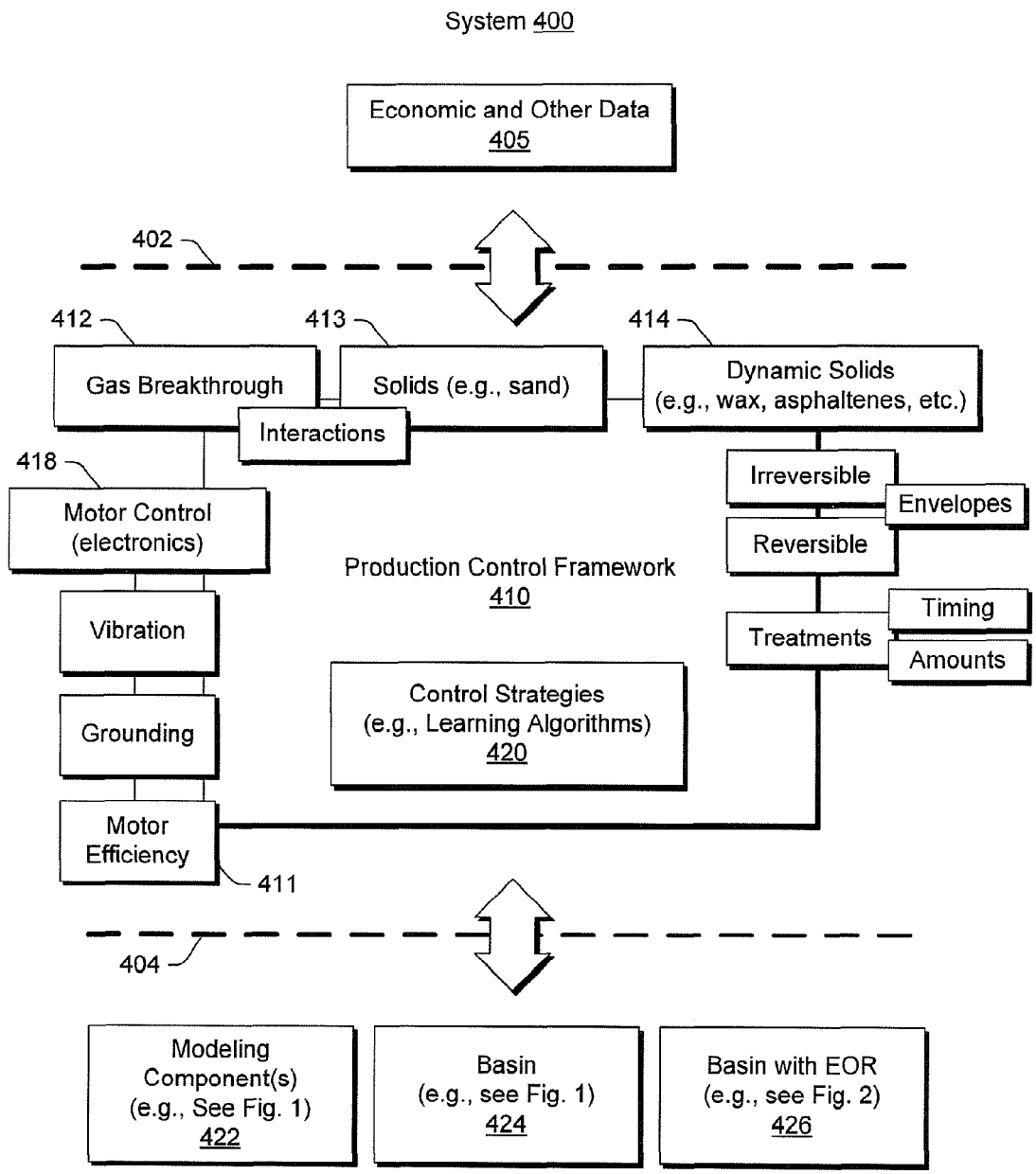
FIG. 4 illustrates an example of a system that includes a production control framework.

FIG. 4 shows an example of a system 400 that includes a production control framework 410 for interacting with economic and other data 405, modeling components 422, a basin 424, or a basin with EOR 426 (e.g., SAGD, etc.). Such a system may optionally be implemented in the ESP system 300 of FIG. 3, for example, where the controller 330 operates according to the production control framework 410. In the example of FIG. 4, the system 400 includes an interface 402 for receipt of data, an interface 404 for interacting with one or more modules, frameworks, etc., and an interface 418 for motor control (e.g., to control one or more ESPs). The system 400 may include one or more other interfaces, for example, for control of other operations for a well, a reservoir, etc.

The economic and other data 405 can include real time market data, weather data, geological data (e.g., earthquake data), political data, etc. For example, market data for price per barrel of oil, gas, etc., may be provided, optionally including futures data or future prediction data. As to weather data, for example, a sea operation may be impacted by tropical storm, hurricane or other conditions. As to geological data, earthquake data may provide for tsunami warnings, pipeline disruption, reduced demand due to infrastructure disruption, etc. As to political data, data as to conflicts, regions impacted, transportation routes impacted, price impacts, etc., may be provided.

The modeling components 422 can include, for example, one or more of the management components 110 of FIG. 1 or other components. The basin 424 may include a basin such as the geologic environment 150 of FIG. 1 or the geologic environment 200 of FIG. 2. As to the basin with EOR 426, an EOR operation may include SAGD or other EOR technology.

The production control framework 410 can include various modules such as a module for modeling gas 412, modules for modeling solids 413 and 414, and a control strategies module or modules 420, which may include one or more learning algorithms, which may allow for closed-loop control. As an example, the control strategies 420 may respond to receipt of data via the interface 402 by updating one or more of the modules for modeling. In such an approach, the modules are subject to feedback in a closed-loop manner.

As to learning algorithms, a learning algorithm may be, for example, one or more of a supervised learning algorithm that generates a function that maps inputs to desired outputs (also called labels, because they are often provided by human experts labeling the training examples); an unsupervised learning algorithm that models a set of inputs, like clustering (e.g., data mining and knowledge discovery); a semi-supervised learning algorithm that combines both labeled and unlabeled examples to generate an appropriate function or classifier; a reinforcement learning algorithm that learns how to act given an observation of phenomena of an environment (e.g., whether naturally occurring, responsive to intervention, etc.) where actions have an impact in the environment, and the environment provides feedback in the form of rewards that guides the algorithm; a transduction algorithm that tries to predict new outputs based on training inputs, training outputs, and test inputs; and a learning algorithm that aims to learn its own inductive bias based on previous experience.

Some examples of supervised learning algorithms include AODE, artificial neural network (e.g., backpropagation), Bayesian statistics (e.g., naive Bayes classifier, Bayesian network, Bayesian knowledge base), case-based reasoning, decision trees, inductive logic programming, Gaussian process regression, group method of data handling (GMDH), learning automata, learning vector quantization, minimum message length (e.g., decision trees, decision graphs, etc.), lazy learning, instance-based learning (e.g., nearest neighbor algorithm and analogical modeling), probably approximately correct learning (PAC) learning, ripple down rules (e.g., knowledge acquisition methodology), symbolic machine learning, subsymbolic machine learning, support vector machines, random forests, ensembles of classifiers (e.g., bootstrap aggregating and boosting), ordinal classification, regression analysis, and information fuzzy networks (IFN).

Some examples of statistical classification include AODE, linear classifiers (e.g., Fisher's linear discriminant, logistic regression, naive Bayes classifier, perceptron, and support vector machines), quadratic classifiers, k-nearest neighbor, boosting, and decision trees (e.g., C4.5, random forests, Bayesian networks, and Hidden Markov models).

Some examples of unsupervised learning include artificial neural network, data clustering, expectation-maximization algorithm, self-organizing map, radial basis function network, vector quantization, generative topographic map, information bottleneck method, and IBSEAD.

Some examples of association rule learning include apriori algorithm, Eclat algorithm and FP-growth algorithm. Some examples of hierarchical clustering include single-linkage clustering and conceptual clustering. Some examples of partitional clustering include K-means algorithm and fuzzy clustering. Some examples of reinforcement learning include temporal difference learning, Q-learning and learning automata.

As to the production control framework 410, control actions can include actions for motor control (e.g., vibration, grounding, motor efficiency, etc.), for gas breakthrough, for solids such as sand, and for dynamic solids that may form and be reversible or irreversible and possibly subject to one or more treatment techniques. The framework 410 may include features to account for interactions, for example, between gas breakthrough and solids (e.g., where a change in motor speed to address intake pressure to an ESP alters entrainment of sand, deposition of sand in a well, location of a suspended sand zone, etc.).

The production control framework 410 can include features to provide flow rate or production estimates, for example, based on measured data (e.g., temperature, pump curves, downhole gauges, other downhole measurements, etc.) and optionally modeling algorithms (e.g., one or more learning algorithms).

In an example embodiment, a system (see, e.g., the system 400) can include an interface (see, e.g., the interface 402) to receive sensed data and economic data; a production control framework (see, e.g., the framework 410) that includes a module for modeling motor efficiency of an electric submersible pump (see, e.g., the module 411), a module for modeling gas composition of a fluid being pumped by an electric submersible pump (see, e.g., the module 412), and a module for modeling solid dynamics in a fluid being pumped by an electric submersible pump (see, e.g., the modules 413 and 414); and a module to update one or more of the modules for modeling in response to receipt of data via the interface (420); and an interface (see, e.g., the interface 418) to output control commands to a controller for an electric submersible pump based at least in part on data received by the interface and analyzed by the production control framework.

Figure 5:
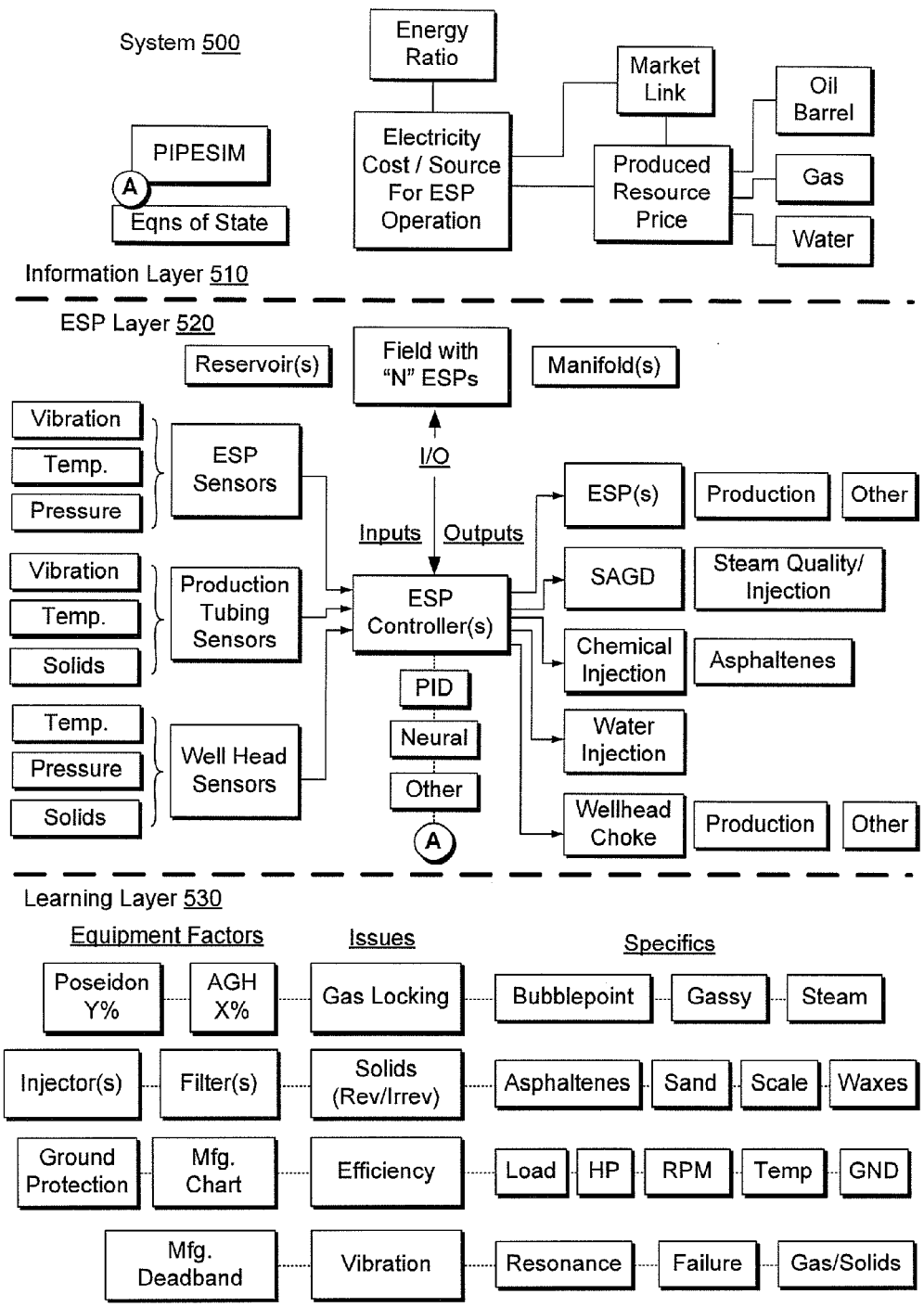
FIG. 5 illustrates an example of a system that includes various layers.

FIG. 5 shows an example of a system 500 that includes an information layer 510, an ESP layer 520 and a learning layer 530. The system 500 may include various features of the system 400 of FIG. 4. For example, in the ESP layer 520, an ESP controller or controllers may interact with the production control framework 410 of FIG. 4. As an example, the controller 330 of FIG. 3 may be an ESP controller of the ESP layer 520 of the system 500 of FIG. 5.

The information layer 510 can include various information modules for acquiring and optionally processing information, for example, for use by the ESP layer 520 and the learning layer 530.

In the example of FIG. 5, the ESP layer 520 includes one or more ESP controllers that can operate according to one or more control algorithms such as the learning algorithms described with respect to the system 400 of FIG. 4, a proportional control algorithm, a proportional and integral control algorithm, a proportional, integral and derivative control algorithm, a proportional and derivative control algorithm, an integral and derivative control algorithm, one or more neural network algorithms, one or more other algorithms, and optionally information from one or more simulation frameworks. As an example, an ESP controller of the ESP layer 520 can operate according to a simulation framework in the information layer 510.

In the example of FIG. 5, the information layer 510 can include a simulation framework such as the commercially available PIPESIM™ framework, which includes a steady-state, multiphase flow simulator for the design and diagnostic analysis of oil and gas production systems. The PIPESIM™ framework includes tools to model multiphase flow, for example, along a well (e.g., from a reservoir to a wellhead). The PIPESIM™ framework includes modeling algorithms for nodal analysis, PVT analysis, gas lift, and erosion and corrosion modeling, which can assist with optimization of production and injection operations. In the example of FIG. 4, the production control framework 410 can optionally include, receive input from or interact with a simulation framework such as the PIPESIM™ framework. As shown in FIG. 3, the controller 330 may include or provide access to the PIPESIM™ framework. As an example, with respect to the system 500 of FIG. 5, the information layer 510 allows an ESP controller of the ESP layer 520 to access the PIPESIM™ framework.

As shown in the example of FIG. 5, an ESP controller of the ESP layer 520 can receive information from one or more ESP sensors (e.g., vibration, temperature, pressure, etc.), from one or more production tubing sensors (e.g., vibration, temperature, solids, etc.), and from one or more wellhead sensors (e.g., temperature, pressure, solids, etc.). As mentioned, an ESP controller can also receive input from or interact with one or more control algorithms (e.g., as in the production control framework 410 of FIG. 4). In turn, an ESP controller can control one or more ESPs in a field (e.g., a geologic environment) for production control or other control. Such control can optionally include manifold control, for example, where one or more ESPs pump into a manifold (e.g., a header). As mentioned, the controller 330 of FIG. 3 may act as an ESP controller and supplant the ESP motor controller 350. As an example, the controller 330 of FIG. 3 may interface with the ESP motor controller 350 to access features thereof to effectuate ESP control.

In the ESP layer 520 of FIG. 5, various outputs are shown with respect to an ESP controller or controllers. For example, output may be directed to one or more SAGD operations (e.g., for steam quality, steam generation, steam injection, etc.), to one or more chemical injection operations (e.g., for an asphaltene treatment or other treatment), to one or more water injection operations, and to one or more wellhead operations (e.g., for choke, production, etc.).

In the learning layer 530, some example issues are shown along with issue specifics and equipment factors. As to gas locking, equipment factors can include an ability or rating of a piece of equipment to handle gas at an inlet to an ESP. For example, a commercially available Poseidon™ multiphase gas handling system (Schlumberger Limited, Houston, Tex.) may be rated to handle a certain fraction or percentage of free gas (e.g., Y %) by breaking up large bubbles into smaller bubbles having less impact on operation of centrifugal pump stages of an ESP while another commercially available AGH™ advanced gas handling device (Schlumberger Limited, Houston, Tex.) may be rated to handle a different fraction or percentage of free gas (e.g., X %) by reducing vapor bubble sizes and changing gas-bubble distribution via homogenization such that a multiphase fluid behaves more like a single-phase fluid. As to issue specifics, one or more models may receive as input information acquired via one or more sensors to provide, for example, bubblepoint values, gassiness values, steam values, etc. Given such values and equipment specifics, an ESP controller may issue one or more instructions (e.g., commands) to an ESP or other equipment (see, e.g., the ESP layer) to reduce risk of gas locking.

As to solids, equipment can include one or more injectors, one or more filters, etc. As mentioned, solids may be earthen solids such as sand or solids that form due to phase, temperature, pressure, chemical reactions, etc., which may form reversibly or irreversibly (e.g., under well conditions). As shown, solids can include asphaltenes, sand, scale, waxes, etc.

As to sand, entrainment of sand may occur where the sand enters an ESP, which may damage one or more components. Further, sand may alter behavior of a pump, which may be exhibited by examining one or more power characteristics, vibration, etc. For sand, a modeling framework may include a mechanical earth model that can identify locations of weak rocks that may readily give rise to sand in response to well-completion operations as well as a reservoir model that describes field-depletion or pressure-maintenance responses. Sand predictions may be provided via one or more modeling frameworks in the form of sand production tendencies at various stresses, flow rates, perforations, well orientation, etc.

To handle sand, one or more exclusion techniques may be employed (e.g., gravel pack, high-rate water pack, frac and pack, openhole gravel pack, expandable screens, etc.). Operation of an ESP may rely on one or more characteristics of an exclusion technique, sand modeling, etc. For example, a maximum sand-free drawdown may be determined using modeling and received by a production control framework to manage production, for example, by control of one or more ESPs (e.g., to maintain an optimum or at least a minimum production requirement).

As to asphaltenes, such solids can clog wells, flowlines, surface facilities and subsurface formations. Operation of one or more ESPs can impact asphaltene dynamics (e.g., formation, dissolution, etc.) as well as effectiveness of one or more treatment techniques (e.g., chemical injection, steam injection, etc.). Changes in pressure, temperature, composition and shear rate can cause asphaltene formation and deposition. Such changes may be induced by any of a variety of operations, including primary depletion, injection of natural gas or carbon dioxide, acidizing treatments and commingled production of incompatible fluids. An envelope may describe asphaltene behavior, for example, in the form of a pressure versus temperature plot with vapor-liquid equilibrium (e.g., bubblepoint) where an upper envelope line and a lower envelope line define a region where liquid and asphaltenes and liquid, vapor and asphaltenes exist.

In some circumstances, asphaltene formation may be avoided by maintaining a high temperature. However, as fluid is moved from a reservoir to a wellhead, temperature and pressure change. As temperature of a fluid depends on heat transfer dynamics, operation of an ESP can impact temperature. To determine how increasing speed or decreasing speed of an ESP will impact asphaltene formation, a controller may include an envelope for use upon receipt of temperature information, pressure information, temperature and pressure information, solids information, etc. Where asphaltene formation is observed or predicted, an adjustment algorithm may adjust ESP operation to determine whether an increase in speed or a decrease in speed helps to avoid asphaltene formation, especially downhole of an ESP. An asphaltene model may account for nanoaggregate formation and formation of clusters of nanoaggregates, for example, to avoid formation of a viscoelastic network of asphaltenes or promote formation of flocculess (e.g., a destabilized asphaltene suspension). Accordingly, where asphaltene formation cannot be readily avoided, a control framework may act to control form of asphaltenes in a fluid.

As to scale as a solid, formation of water may be a concern, for example, as in a steam injection operation where steam may condense and be pumped to a wellhead via an ESP. As water is a good solvent, it can contain dissolved minerals as well as dissolve minerals as it flows in subsurface formations. Once in a well, changes in pressure, temperature, phase composition, etc., can cause deposition of minerals as the solubility or ability to solvate minerals changes. To handle scale, one or more treatments may be applied, which may impact or be impacted by operation of an ESP.

The learning layer 530 of FIG. 5 further illustrates efficiency as being dependent on equipment factors and, for example, load, horsepower, speed, temperature and grounding. As mentioned, an ESP may be provided with an efficiency chart that indicates an efficiency range. Such information may be input to an ESP controller for purposes of making adjustments to one or more operations to increase or maintain an acceptable efficiency, which may be based in part on an overall economic analysis that accounts for power costs and market price of a pumped resource. For example, where power cost rises at a lesser rate than cost of oil, an overall economic balance may indicate that operation at a suboptimal efficiency is economically feasible. Such an analysis may account for longevity of an ESP, for example, where suboptimal operation impacts longevity.

As to vibration issues, a manufacturer of an ESP may provide a deadband, a band of operational parameters to be avoided due to vibration. For example, if an ESP is operated at a particular speed or the motor operated using a particular phase, frequency, etc., vibration may occur. Such vibration may be inherent in structure of an ESP and may depend on one or more characteristics of fluid (single phase, multiphase, etc.) being pumped. For example, where free gas exists, an actual deadband may deviate from a manufacturer provided deadband. Conditions such as mechanical resonance can be detrimental and lead to rapid failure of one or more components. Further conditions that give rise to electro-magnetic resonance can be detrimental and lead to rapid failure of one or more components. With respect to electro-magnetic resonance, power line lengths, impedances, etc., may come into play (e.g., where a standing wave sets up in a power cable). An ESP controller can include a module that detects resonance and that acts to adjust one or more parameters to alleviate resonance. As an example, mechanical resonance may be detected via vibration data while electro-magnetic resonance may be detected via temperature or power transmission data.

Figure 6:
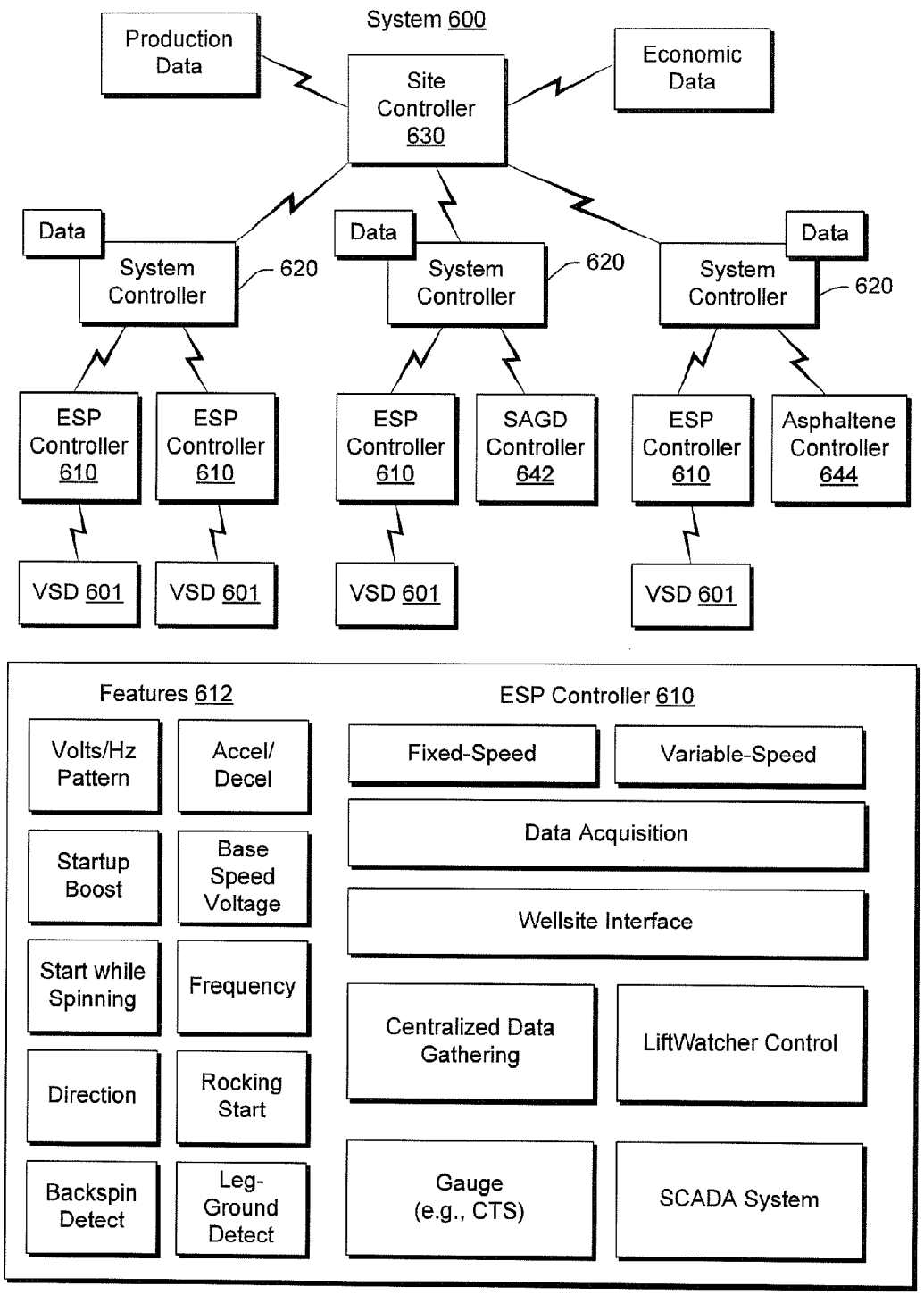
FIG. 6 illustrates an example of a system that includes an ESP controller.

FIG. 6 shows an example of a system 600 that includes a hierarchy of VSD units 601, ESP controllers 610 and optionally other types of controllers 642 and 644, system controllers 620 and a site controller 630. The production control framework 410 of FIG. 4 may include features to implement one or more of the controllers of the system 600. For example, the production control framework 410 of FIG. 4 may include a site control module to implement the site controller 630, one or more system control modules to implement the system controllers 620, one or more ESP control modules to implement the ESP controllers 610 and optionally one or more other modules to implement the SAGD controller 642, the asphaltene controller 644 or one or more other controllers. FIG. 6 shows examples of some features 612 that may be provided by the ESP controllers 610. Such features may optionally be provided by one or more of the aforementioned equipment or frameworks (e.g., consider the various Schlumberger Limited equipment or frameworks).

Figure 7:
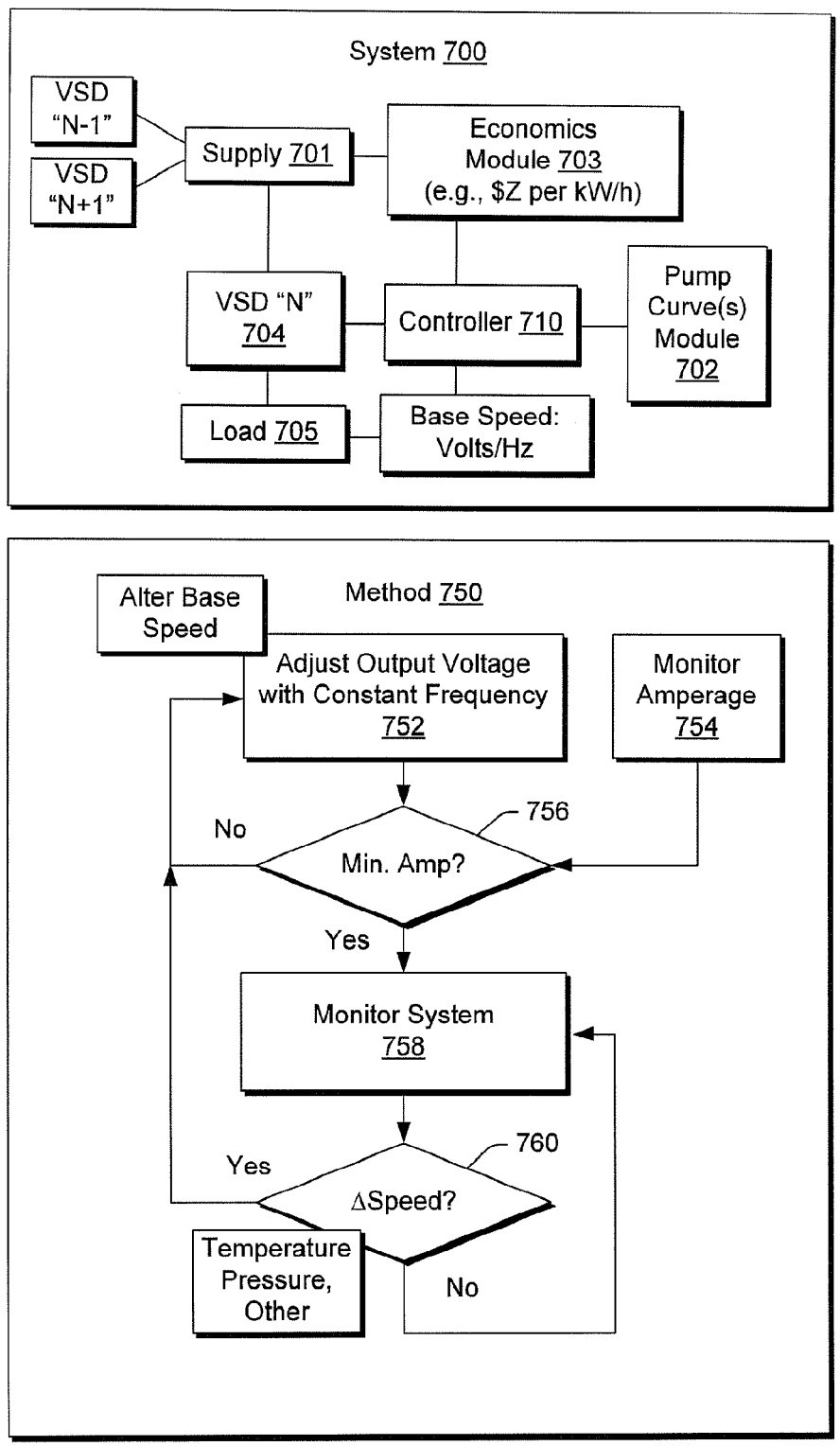
FIG. 7 illustrates an example of a system and an example of a method.

FIG. 7 shows an example of a control system 700 along with a method 750 that provides for optimizing voltage to minimize current consumption by an ESP motor. The system 700 includes a supply 701 linked to a pump curve(s) module 702 and an economics module 703 (e.g., to provide a cost of power), a VSD unit 704 linked to a controller 710 and a load 705 which is a motor having a base speed defined as volts divided by frequency. In the example of FIG. 7, the controller 710 can receive information as to volts and frequency and instruct the VSD unit 704 to provide at least a particular voltage to the load 705. As indicated, the controller 710 may receive information from the economics module 703. Such information may allow the controller 710 to output real time cost information for an ESP. In the example of FIG. 7, the method 750 includes an adjustment block 752 for adjusting output voltage with a constant frequency and a monitor block 754 to monitor current. A decision block 756 decides whether a minimum operational current exists in response to an adjustment in voltage per the adjustment block 752 based at least in part on information received from the monitor block 754. Where the decision block 756 decides that a minimum current does not exist, then the method 700 continues at the adjustment block 752. However, if the decision block 756 decides that a minimum exists, then the method 700 continues to a system monitor block 758 to a monitor a system such as the system 700. The system monitor block 758 may proceed to or include one or more decision blocks such as a speed decision block 760 for deciding whether a change in speed of a motor has occurred or is called to occur (e.g., as part of a control command). Where the speed decision block 760 decides that a change in speed has not occurred, the method 700 can return to the system monitor block 758 while where the speed decision block 760 decides that a change in speed has occurred or will occur, the method 700 continues to the adjustment block 752 to adjust the voltage to achieve a minimum current. In such an example, the adjustment block 752 may include one or more optional adjustment limits (e.g., to limit adjustment to voltage by a percentage about a mid-point voltage).

The system 700 and the method 750 may act to automatically optimize a motor by adjusting voltage to the motor while not changing the speed of the motor (i.e., maintaining a motor at a constant speed). As shown in the example of FIG. 7, base speed is defined as voltage divided by frequency. Thus, the method 750 may alter base speed by adjusting voltage only to achieve a minimum current (e.g., current draw) by a motor. In other words, such a method can optimize a synchronous motor by changing the supply voltage to the motor while leaving the frequency unchanged. Monitoring of current can provide for observation of a lowest value, which may yield the best efficiency point for the motor and system. Such an approach can cause the motor to run cooler and save energy costs (see, e.g., economics module 703).

As described with respect to the system 700 and the method 750 of FIG. 7, electricity charges may be saved by reducing heat generate by equipment as an optimized motor will draw the lowest current possible while doing the same amount of work (i.e., working at its best efficiency point). If a motor were to draw more current than needed, this will cause simple heat losses in the motor windings and the cable that is feeding the motor due to the internal electrical resistance of the windings and cable. These losses translate into charges per kW/hour, whether paid to a power company, resulting in an increased power demand on an on-site generator (e.g., which may increase generator maintenance costs), etc. Further, heating of a motor can cause premature aging of the insulating materials. Specifically, when there are simple heat losses that occur in the motor the overall temperature of the motor will be higher causing premature aging of the insulation materials in the motor. When this happens the motor life can be shortened, which can raise the need to replace the motor prematurely at a cost to operator of the well. This results in a loss of production and can also cause complications with the well if there is no production for extended periods of time as this presents a loss or deferment of production of the well.

Many VSD units operate at standard input voltages that range, for example, from about 380 V to about 4.16 kV or more. For a SpeedStar 2000 Plus™ VSD unit (Schlumberger Limited, Houston, Tex.) or SineWave Drive™ (SWD) unit (Schlumberger Limited, Houston, Tex.) rated to operate at 480 V, if a VSD unit is rated for 1000 kVA, this means that the unit will output 1000 kVA at 480 V. Such a relationship holds for various VSD units to some extent as many VSD units have an upper and lower limit for the input voltage that they can operate.

Various VSD units may change their base speed (commonly known as the output Volts/Hz ratio) when running. The base speed of a VSD unit is described as the point at which the VSD unit reaches it maximum output voltage at a specified frequency. As described with respect to the example of FIG. 7, a motor can be optimized by adjusting the voltage delivered to a motor according to load. For example, if a motor is lightly loaded (e.g., a 100 HP motor with a 60 HP load), the power factor of the motor will not be at its best point if the voltage to the motor is at the nameplate value of the motor (e.g., typically about 60 Hz). By lowering the voltage to the motor the current used will be lower causing the system efficiency to be at its best point.

Where a VSD unit has the ability to change output voltage while running, with appropriate controls and programming, the VSD unit has the ability to adjust its output voltage and keep its output frequency at steady while monitoring the output current. In such an approach, a VSD unit can basically adjust the voltage to the motor and find the lowest current that the motor will run and thereby optimize the motor for its load.

The controller 710 can optimize power consumption to the load of a motor, optionally by staying within a specified range of the motor voltage, for example if the motor is designed to run at 2 kV at 50 amps at 60 Hz then the voltage range may be specified as about 20% of the 2 kV (e.g., 1.6 kV to 2.4 kV). Such ranges or specifications can differ depending on motor characteristics and may be, for example, tailored to a lower or higher value.

As shown in the example of FIG. 7, optimization could be performed every time a speed change is made to the motor or where motor temperature changes as both of these have a bearing on the amount of energy that a motor will consume. As to motor temperature, one or more sensors may provide for such information.

As mentioned, fluid flow can alter heat transfer, especially for a motor and thereby alter steady-state operating temperature. Accordingly, a method can include adjusting voltage while maintaining a constant frequency to achieve a minimum current at a steady-state temperature (e.g., a temperature that varies within a set range over a period of time, such as hours or days). Where a change in speed occurs, a temperature algorithm may be implemented where the temperature algorithm may determine whether temperature changes occur due to load or due to cooling of a motor by a fluid.

The controller 710 of FIG. 7 may be an ESP controller of the ESP layer 520 of the system 500 of FIG. 5. As indicated in the learning layer 530 of the example of FIG. 5, efficiency issues may arise for any of a variety of reasons and as described with respect to FIG. 7, efficiency may be optimized for an ESP. An ESP controller may include features to address both efficiency issues and efficiency optimization. Further, an ESP controller may integrate such features with one or more other features, for example, to control issues such as gas locking, solids or vibration. An ESP controller may include features to handle power factors, predict harmonics, etc. Inputs to such a controller can include direct surface controller measurements (PF, ITHD, VTHD) or other indirect variables e.g. pressure, temperature, etc.

Figure 8:
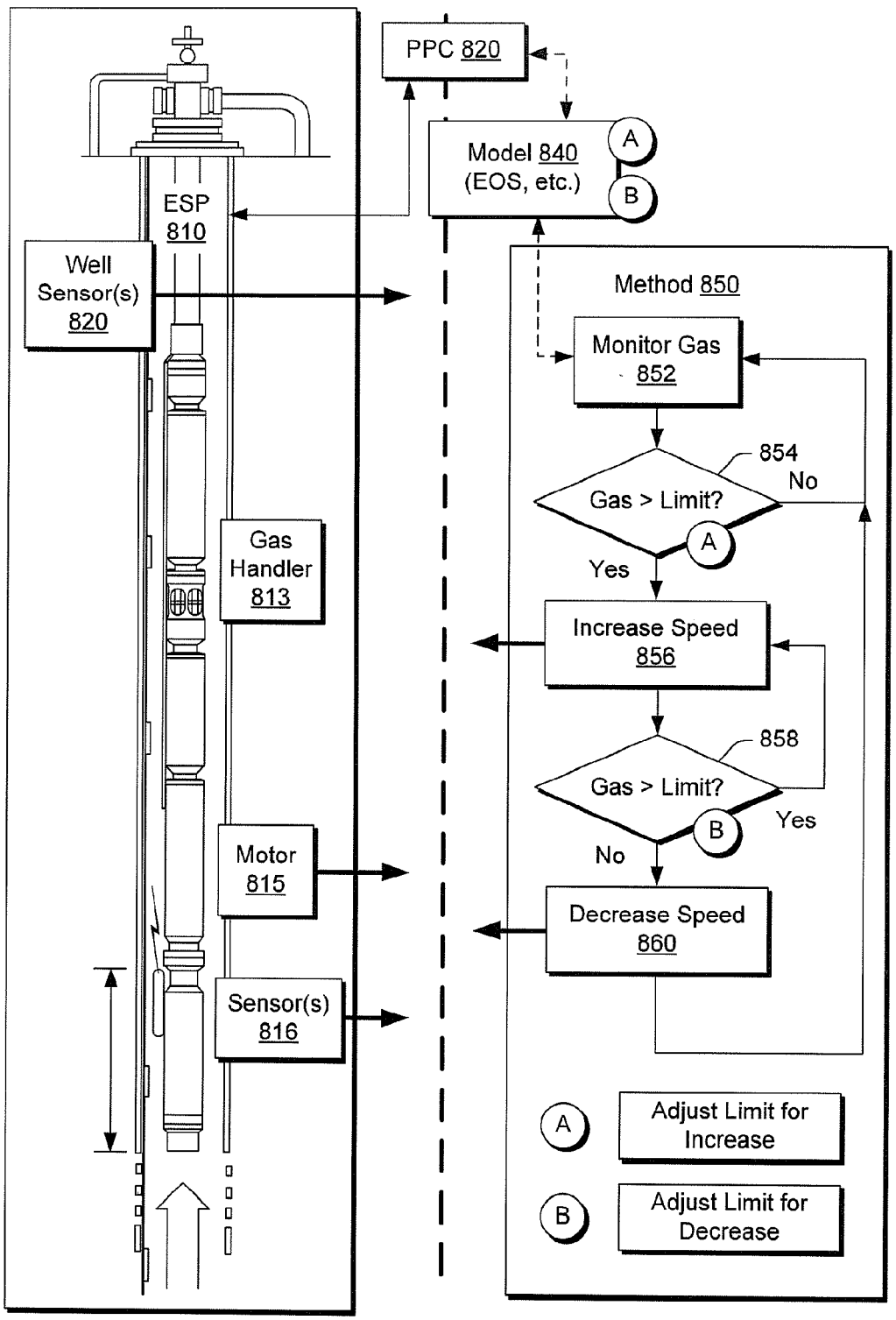
FIG. 8 illustrates an example of a ESP and sensors and an example of a method.

FIG. 8 shows an example of an ESP 810 and an example of a method 850. The ESP 810 includes a pump performance curve (PPC) 820 (e.g., provided by a manufacturer, accessed from a database, determined via operational assessment, etc.) and optionally includes one or more gas handling components 813 (e.g., which may be rated by a manufacturer, rated by specifications in a database, rated by operational assessment, etc.). The ESP 810 includes a motor 815 and optionally one or more sensors 816. The ESP 810 may be disposed in a well outfitted with one or more well sensors 820. As shown, the one or more ESP sensors 816, the one or more well sensors 820 or a combination thereof may provide information for use by the method 850. Additionally, or alternatively, information related to operation of the motor 815 may be provided for use by the method 850. In the example of FIG. 8, load on the motor 815 may change with respect to free gas, which may be seen as to current demand of the motor 815. While the ESP 810 is illustrated as being oriented vertically, orientation of the ESP 810 may be at any angle (see, e.g., the ESP 235 of the example of FIG. 2).

The method 850 includes a monitor block 852 for monitoring gas in a fluid being pumped by an ESP, a decision block 854 for deciding whether gas has exceeded a gas limit (e.g., according to a gas handling component), an increase speed block 856 for increasing speed of an ESP, another decision block 858 for deciding whether gas has exceeded a gas limit (e.g., according to specifications or measured operation of a gas handling component) and a decrease speed block 860 for decreasing speed of an ESP. As indicated where the decision block 854 decides that a gas limit has been exceeded, the method 850 increases speed of an ESP motor in an effort to move gas more quickly through the ESP, for example, if the gas is temporary (a gas zone). Upon an increase in speed, the decision block 858 determines whether gas still exceeds a gas limit. Where gas no longer exceeds the gas limit, the method 850 calls for decreasing speed of the ESP motor, for example, to return the ESP to a predetermined or pre-existing production rate.

Gas breakthrough may be defined by a low pressure zone in an impeller that gets filled up with gas to a point where the pump loses head (i.e., ability to push liquid to surface). An ESP controller may include features to determine limits of gas production, optionally with or without a gas handling unit or units. For example, the method 850 may include changing one or more gas limits as an exploratory or learning stage to determine how changes in speed (e.g., increases, decreases, or increases and decreases) may impact gas and handling of gas. Such an approach may arrive at a combination of limits and speeds to handle gas, which may characterize a particular ESP in a particular well operation.

The method 850 of FIG. 8 may include monitoring of temperature and pressure and optionally include implementation of a simulation framework (see, e.g., model block 840). For example, the PIPESIM™ framework may be implemented to determine phase composition and risk of increase in free gas downhole of an inlet to an ESP. Further, the method 850 may include adjusting speed and measuring temperature and pressure such that an impact of a speed adjustment may provide for a prediction as to a change in phase composition of a fluid being pumped by an ESP.

In the example of FIG. 8, the method 850 may include accessing equations of state (EOS) or black-oil correlations to assess phase composition and to predict bubblepoint for fluids containing dissolved gas. Bubblepoint refers to the pressure and temperature conditions at which the first bubble of gas comes out of solution. For oil and gas reservoirs, at time of discovery, oil can include dissolved natural gas and may be fully saturated with natural gas (i.e., at its bubblepoint). Where oil is undersaturated, as pressure is lowered (e.g., at a constant temperature), the pressure at which the first gas begins to evolve from the oil is defined as the bubblepoint. As an example, where free gas (e.g., bubbles) does not exist at an inlet to an ESP, a method may operate the ESP to decrease pressure while monitoring for presence of free gas. In such an example, the ESP may determine the bubblepoint for the fluid being pumped at that particular time and optionally include such information in a production analysis to arrive at an optimum flow rate for the fluid, which may be below, at or above the bubblepoint. A sensitivity analysis on the operating parameters may determine the best course of action should an increase or a decrease in gas be detected or, for example, should a change in temperature, pressure, etc., be detected. As to a best course of action, such action may account for economic factors (e.g., production rate, power costs, motor lifetime, etc.). The aforementioned PIPESIM™ framework includes capabilities to perform a sensitivity analysis in a system that can include multiphase flow and includes a database of ESP manufacturer pump performance curves, motors, and cables. Further, the PIPESIM™ framework allows for updating pump performance curves based on actual pump performance information.

In the example of FIG. 8, the method 850 may include solids monitoring where, for example, solids monitoring indicates whether an increase or a decrease in speed causes or increases risk of a solids issue (e.g., sand, asphaltenes, waxes, scale, etc.). For example, a decrease in speed of an ESP motor may cause aggregation of asphaltenes and an increase in speed of an ESP motor may cause entrainment of sand. Such information gleaned from a gas control method may be used by a learning algorithm of a production control framework such as the framework 410 of FIG. 4.

In the example of FIG. 8, the model block 840 can include the aforementioned PIPESIM™ framework, which includes capabilities to perform heat transfer calculations, $CO_2$ corrosion rate calculations, erosional velocity limits calculations, and single-phase wax deposition calculations for flowlines (e.g., with dbrSOLIDS™ software, marketed by Schlumberger Limited, Houston, Tex.). In the example of FIG. 8, the model block 840 can receive information from various equipment (e.g., measurements, control commands, etc.) and optionally update one or more models or model parameters using such information. For example, the model block 840 can include updating one or more pump performance curves of the PPC block 820 based at least in part on information received (e.g., measurements, control commands, etc.). As explained, a PPC may be a plot of lift versus capacity along with horsepower and efficiency, for example, for a stated specific gravity (mass of a unit of volume with respect to a reference substance) or American Petroleum Institute "gravity". On the American Petroleum Institute scale for gravity ((141.5/specific gravity)−131.5), water has a gravity of 10 degrees while heavy oil may have a gravity from about 10 degrees to about 20 degrees and ultra heavy oils may have a gravity from about 0 degrees to about 10 degrees. As free gas, bubblepoint, specific gravity (or gravity), etc., may be determined by the method 850, such information can be beneficial to update one or more PPCs (e.g., the PPC block 820). Further, calculations for production in barrels or other volumetric measures may include specific gravity (or gravity).

As an example, the production control framework 410 of FIG. 4 can include one or more modules for performing the method 850 of FIG. 8. Performance of the method 850 may provide meaningful data for production control, for example, by providing information as to specific gravity (or gravity), motor efficiency, etc. Given such input, the production control framework 410 can perform an economic analysis that aims to optimize overall economics (e.g., ESP lifetime, ESP power costs, production rate, etc.).

Figure 9:
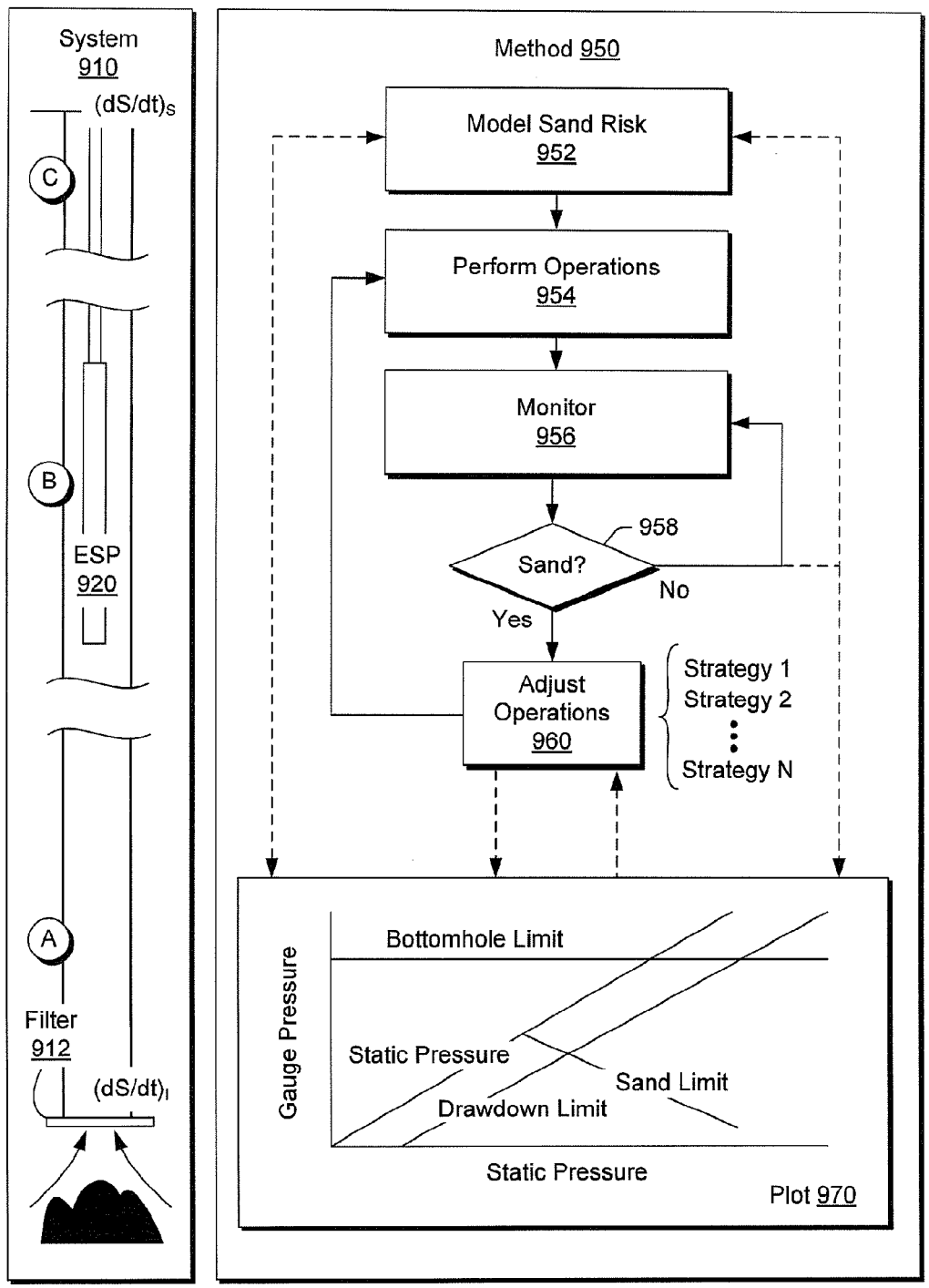
FIG. 9 illustrates an example of a system and an example of a method.

FIG. 9 shows an example of a system 910, an example of a method 950 and an example of a plot 970. The system 910 includes an ESP 920 and three regions: a downhole region A downhole of the ESP 920, an ESP region B and an uphole region C uphole of the ESP 920. The system 910 is shown as including sand near an intake, which may possibly be entrained by operation of the ESP 920. The system 910 may optionally include a filter 912, which may act to diminish entrainment of sand. The system 910 may include various sensors, for example, as described with respect to the example of FIG. 3.

In the system 910, once entrained, sand may be present in one or more of the regions A, B and C. Operating strategies may depend on where sand is present as well as other factors (e.g., economics, etc.). While the example system 910 of FIG. 9 is shown as being oriented vertically, such a well may include legs, curves, etc. (see, e.g., the example of FIG. 2).

The method 950 includes a model block 952 for modeling sand risk, a performance block 954 for performing operations, a monitor block 956 for monitoring operations, a decision block 958 for deciding whether sand is being produced or present in an ESP, and an adjustment block 960 to adjust operations based at least in part on the detection of sand.

In the example of FIG. 9, the model block 952 may include an earth model, a reservoir model, a well model or other model. Such a model may indicate areas of weak rock that may be subject to stress that causes the rock to degrade into sand. Such a model may indicate existing areas of sediment (e.g., sand) in a subsurface formation. A well model may indicate that an intake is located at or near a region where sand entrainment may occur. Such information may be taken into account when determining production goals or more generally operations germane to a well, a reservoir, a basin, etc.

In the example of FIG. 9, the performance block 954 includes performance of one or more ESP operations and optionally one or more other types of operations (see, e.g., various types of operations of FIG. 5). As to the monitor block 956, information may be monitored from one or more sources (e.g., sensors of the system 910 or other sources). For example, an acoustic wave or pressure wave monitor (e.g., seismic monitor) may indicate that a portion of a subsurface formation has collapsed, which may give rise to sand or an increased risk of sand being entrained and pumped by an ESP. The monitor block 956 may include fiber optic monitoring where, for example, fiber optic information acquired by one or more fiber optic cables disposed in a well indicate that a substance such as sand is depositing along a length of a pipeline (e.g., a horizontal section, etc.). For example, where a portion of a fiber optic becomes covered in sand, the heat transfer characteristics may alter one or more time constants as to sensing (e.g., where a change in fluid temperature does not immediately give rise to a change in fiber optic temperature or where buffering appears as more slowly changes in temperature). As another example, monitoring may occur at a wellhead or at a processing station that receives fluid from a wellhead. Such monitoring may include a device that decreases (e.g., settling chamber) or increases (e.g., cyclone) fluid velocity to uncover presence of sand or other solids.

As to the decision block 958, a sand detection limit may be used, optionally for a particular location or locations in a well, at a wellhead, etc. The method 958 may include multiple decision blocks each block for a particular location with a particular detection limit, optionally based on one or more monitoring techniques, etc. In the example of FIG. 9, the decision block 958 may optionally provide feedback to the model block 952, for example, to update a model based on actual sand information.

As to the adjustment block 960, one or more operational parameters may be adjusted. For example, an ESP motor may be adjusted in an effort to remove sand, adjust a sand zone, entrain less sand, create a sand free zone around an inlet to a well, etc.

The method 950 can optionally be implemented for production operations from unconsolidated formations (e.g., without sand control), for production operations where an ESP may become stuck or otherwise impacted by sand, for production operations that include establishing flow assurance. For unconsolidated formations, an operation can include drawing the well down slowly, cleaning up the well (e.g., to produce loose sand to surface), determining minimum flow rate to prevent from plugging up, which can optionally account for conditions as to vertical wells versus deviated wells (e.g., wells with one or more horizontal portions).

In the example of FIG. 9, the plot 970 includes a drawdown pressure boundary for a maximum flow rate as well as a sand limit. The plot 970 can provide an estimate of risk of formation or completion damage, for example, in relationship to ESP speed, whether for production rate or for entrainment or other types of sand flow. In the method 950, the adjustment block 960 may adjust operations based at least in part on information in the plot 970. Further, information of the plot 970 may be updated or revised based at least in part on information gleaned during performance of the method 950. For example, where the decision block 958 makes a decision, the decision, information associated with the decision, etc., may be communicated to a module that acts to update or revise one or more boundaries of the plot 970. As mentioned, a geomechanical model may provide information germane to risk of formation or completion damage, which may give rise to sand issues. The method 950 may provide information to such a model (e.g., per the model block 952) to manage or generate information germane to operation of an ESP (e.g., per the plot 970).

The method 950 can include operational adjustments (e.g., per the adjustment block 960) for handling an extreme case of solids production where an ESP may become locked, subject to risk of damage, etc. The method 950 may include learning for sandy operating conditions to build a model that can optionally be applied to other ESP installations.

The method 950 may optionally include drawing down a well using an ESP, detecting production of sand, operating the ESP to determine characteristics of the production of sand and then selecting a strategy to handle further drawing down of the well to mitigate impact of sand.

As to monitoring of sand, the monitor block 956 can include receiving information from one or more downhole vibration sensors, a sand detector at a wellhead or a combination thereof. Given such information, the method 950 may include determining whether an accumulation of sand is occurring in production tubing and whether such sand is above an ESP (see, e.g., region C of the system 910) and at a risk of descending down into the ESP. As to options, the method 950 may include operating an ESP to maintain a minimum flow rate to keep sand out of pump and, optionally, to remove sand at a wellhead (e.g., in an effort to clean out a pipeline). Such an approach may include modeling sections of a pipeline to include orientation of the pipeline with respect to gravity, which can impact settling, flow, etc., of sand. An approach can include operating an ESP to deposit sand at a particular portion of a pipeline, for example, along one side of a horizontal section of a pipeline.

An example of a method that includes learning can include sensing at two or more locations with respect to a well. For example, such a method can include sensing downhole and sensing at the surface and determining whether sand is accumulating in a pipeline. In such an example, the sensing downhole may provide a sand rate (e.g., an intake sand rate $(dS/dt)_I$) and the sensing at the surface may provide another sand rate (e.g., a surface sand rate $(dS/dt)_S$). A method can include determining a difference between these two rates to estimate an accumulation rate. Based on the estimated accumulation rate, the method can include adjusting speed of an ESP to diminish the difference such that less sand accumulates in the pipeline. Further, while adjusting speed of an ESP, sensing may continue (e.g., downhole and at the surface) to determine whether one or more sand rates change. For example, an increase in speed of an ESP may entrain more sand at an intake and act to clear accumulated sand via a wellhead. Sensing may occur over a period of time to determine whether a steady-state is reached such that accumulation is avoided or whether the rate of sand entering an intake exceeds the rate of sand exiting via a wellhead such that accumulation continues (e.g., but with differing dynamics than for a prior ESP speed).

With respect to altering a speed of an ESP, a method can include one or more other factors such as efficiency, cooling, gas production, formation of solids such as wax or asphaltenes, etc.

As an example, the production control framework 410 of FIG. 4 can include one or more modules for performing the method 950 of FIG. 9. Performance of the method 950 may provide meaningful data for production control, for example, by providing information as to specific gravity (or gravity), motor efficiency, etc. Given such input, the production control framework 410 can perform an economic analysis that aims to optimize overall economics (e.g., ESP lifetime, ESP power costs, production rate, etc.).

Figure 10:
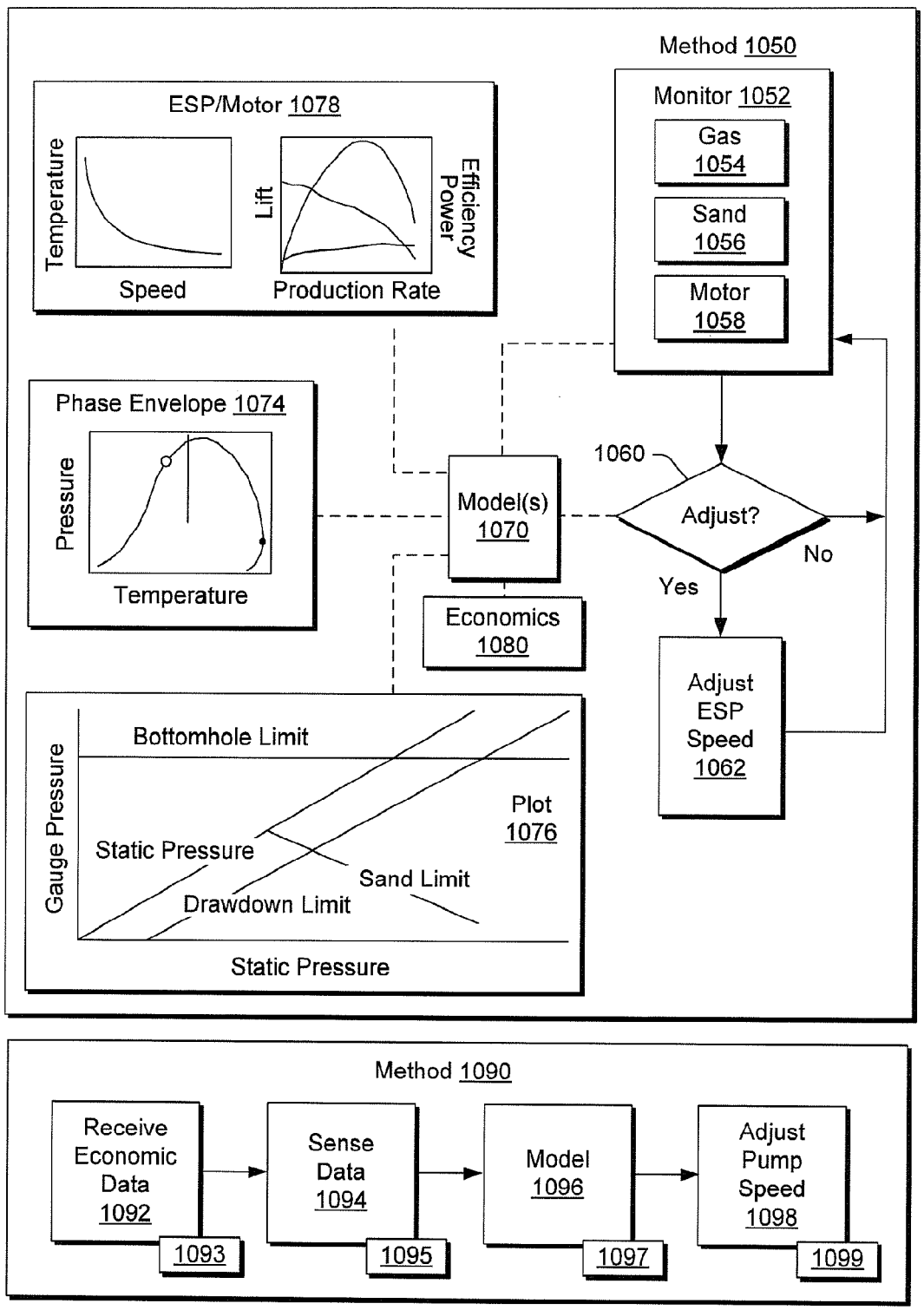
FIG. 10 illustrates an example of a method.

FIG. 10 shows an example of a method 1050 for handling issues with respect to gas and solids and a method 1090 for adjusting a pump. In the example of FIG. 10, the method 1050 can include accessing one or more models 1070 that provide information as to operation of a well. For example, the one or more models 1070 can provide information on phase envelopes provided by a phase model 1074 that indicate bubblepoints with respect to temperature and pressure, can provide information on sand via a sand model 1076 such as a limit with respect to one or more pressures, can provide information on an ESP via an ESP model 1078 that provide information such as operational temperature of a motor with respect to production rate of an ESP and a pump performance curve and can provide information on economics via an economics model 1080.

As to the phase model 1074, this may be a hydrocarbon phase envelope model for a retrograde condensate where between the bubblepoint and dewpoint curves, hydrocarbon fluids are in two phases. In a hydrocarbon phase envelope, lines of constant liquid mole fraction meet at the critical point (open circle). Fluids that enter the two-phase region to the right of the critical point are termed retrograde condensates and fluids at temperatures greater than the cricondentherm (closed circle, highest temperature point on the curve) remain single-phase at all pressures. If an initial reservoir condition of temperature and pressure is above the phase envelope and between the critical temperature and the cricondentherm, the fluid goes through a dewpoint and liquid drops out of the gas phase as the reservoir pressure declines (see, e.g., a vertical line that starts at an initial reservoir condition and decreases across the curve).

In the example of FIG. 10, the method 1050 includes a monitor block 1052 for monitoring one or more sensors for gas 1054, monitoring one or more sensors for sand 1056 and monitoring one or more sensors for a motor 1058. Information acquired via such monitoring may be transmitted to the one or more models 1070. Based on the monitoring of the monitor block 1054, a decision block 1060 can decide whether an adjustment should be made to an ESP. As indicated, the decision block 1060 may make a decision based on at least some of the monitored information and optionally one or more of the one or more models 1070. For example, if the monitoring of the motor 1058 indicates that a motor temperature has increased, the decision block 1060 may consult the phase model 1074 and the motor model 1078 to determine if ESP speed can be increased to increase cooling of the motor while maintaining a pressure above a bubblepoint pressure to thereby avoid emergence of gas. As the increase in ESP speed may increase production rate, the decision block 1060 may also decide whether efficiency will increase or decrease and use an economic model 1080 that provides an economic analysis that accounts for motor life, power costs and production rate. In such an example, the decision block 1060 may increase motor speed to cool the motor and thereby increase motor life if: (i) an associated increase in production rate, cooler running of the motor, etc., result in an increase in motor efficiency (e.g., decrease in power consumption) while (ii) the increase in motor speed does not lead to generation of gas and accumulation of sand. Given the models such as the models 1074, 1076 and 1078, items (i) and (ii) may be predicted. Further, where the method 1050 enters an adjustment block 1062 to adjust ESP speed, monitoring of the monitor block 1052 may indicate whether the predicted outcome was correct.

In instances where a predicted outcome is incorrect, the method 1050 may revert back to a prior state of operation (e.g., prior to the adjustment) and provide information acquired via monitoring to one or more of the models 1070 for purposes of model update or model revision. In turn, the decision block 1060 may reassess its decision and, if appropriate, proceed to the adjustment block 1062 to adjust ESP speed.

In the example of FIG. 10, the method 1090 includes a reception block 1092 for receiving economic data; a sensing block 1094 for sensing data associated with operation of a well; a modeling block 1096 for modeling, based at least in part on the sensing data, an electric submersible pump disposed in the well, gas composition of fluid being pumped by the electric submersible pump and solid dynamics in a fluid being pumped by the electric submersible pump; and an adjustment block 1098 for adjusting, based on the modeling and the economic data, a speed of the electric submersible pump.

While a reception block and a sensing block are shown in the example method 1090 of FIG. 10, an access block for accessing data may be provided (e.g., where data is available from a data store, a network, sensing or other equipment, etc.). Sensing of data, or reception or access to sensed data, may occur based at least in part on a model. For example, if evolution of an operation begins to approach an undesirable domain (e.g., per the plots 1074, 1076 or 1078, or more generally "model(s)" 1070), data sensing, reception, access, etc., may occur more frequently and monitoring (e.g., per the monitor block 1052) may optionally occur more frequently. Such frequency or frequencies may optionally be determined with respect to underlying physical dynamics, control dynamics, etc., to ensure that a situation can be controlled, for example, to avoid undesirable consequences (e.g., emergence of gas, entrainment of sand, precipitation of solids, overheating of a motor, resonance frequency of equipment, etc.).

In the example of FIG. 10, various blocks 1093, 1095, 1097 and 1099 are also shown, which may be computer-readable media blocks for computer-readable media that includes instructions to instruct a computing device, system, etc., to perform one or more actions of the method 1090. As an example, one or more computer-readable media can include processor-executable instruction to instruct a computing device to: access data that includes economic data (e.g., block 1093 and block 1095 where such data may be accessed from a storage, a device, etc.); model an electric submersible pump disposed in the well, gas composition of fluid being pumped by the electric submersible pump, and solid dynamics in a fluid being pumped by the electric submersible pump (e.g., block 1097); and output one or more control commands to a controller to control a motor of the electric submersible pump (e.g., block 1099).

With respect to the method 1090, an adjustment may include adjusting voltage of a motor of the electric submersible pump while maintaining a constant frequency and searching for a minimum current draw (e.g., for operating the motor at a voltage that corresponds to the minimum current draw).

As to the economic data, such data may be relied on to perform an economic analysis that accounts for longevity of the electric submersible pump, power consumption of the electric submersible pump and production rate and market price of processed fluid pumped by the electric submersible pump.

While various examples refer to control of a pump, control may occur additionally, or alternatively, for injection equipment, for example, such that a process or system outputs one or more control commands to a controller to control injection of a substance to enhanced fluid recovery from a well.

Figure 11:
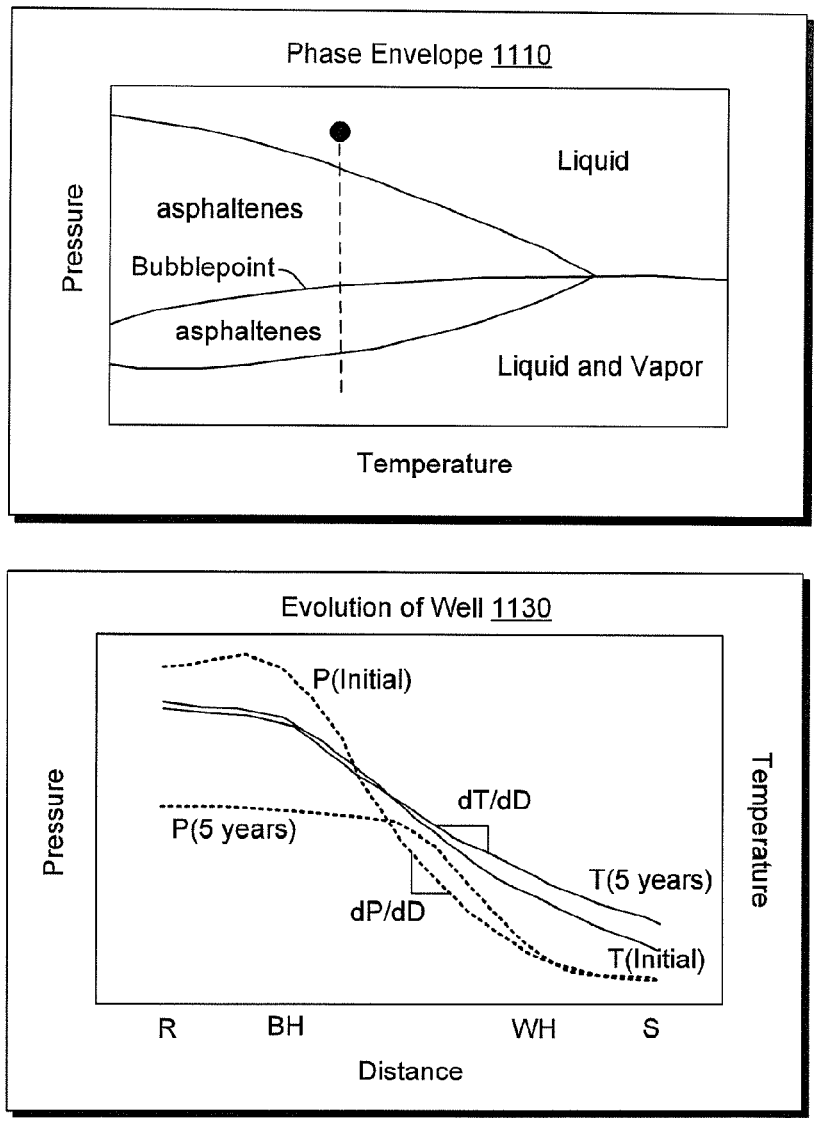
FIG. 11 illustrates an example of a phase envelope, an example of evolution of a well and an example of a method.

FIG. 11 shows an example of an asphaltene precipitation plot 1110, a well evolution plot 1130 and an example of a method 1150 for adjusting one or more operating parameters with respect to asphaltene formation or asphaltene behavior, which may optionally include accessing one or more models 1170.

In the plot 1110, an asphaltene-precipitation envelope (APE) is shown for a pressure-temperature space. The asphaltene-precipitation envelope delimits stability zones for asphaltenes in solution. For a given example reservoir condition (filled circle), primary depletion causes pressure to decrease. When pressure reaches the upper asphaltene-precipitation envelope, also known as the asphaltene-precipitation onset pressure, the least-soluble asphaltenes may be expected to precipitate. As pressure continues to decrease, more asphaltenes may be expected to precipitate, until the bubblepoint pressure is reached, and gas is released from solution.

As indicated, the asphaltene envelope may be traversed, for example, for a continued pressure decrease (e.g., where enough gas has been removed), the liquid phase of a two-phase mixture may begin to redissolve asphaltenes (e.g., see the curve forming the lower portion of the asphaltene-precipitation envelope).

In the plot 1130, evolution of well pressure and temperature are shown with respect to distance. As indicated, well pressure is high at the reservoir (R) and diminishes toward the wellhead (WH) and separator (S). Over time (e.g., a period of years), well pressure tends to diminish. With respect to temperature, it also diminishes with respect to distance but may remain relatively stable with respect to time. Referring again to the phase envelope 1110, where temperature remains constant and pressure decreases, asphaltenes may precipitate. For the well evolution plot 1130, such conditions occur with respect to time for portions of the well, especially those closer to the reservoir.

To combat asphaltene precipitation, chemicals may be injected into a well, however, such a process can be costly and time consuming. Further, chemicals may be detrimental to equipment. For example, some chemicals may degrade elastomers used in ESPs. Thus, where chemical injection occurs to combat asphaltenes, economic consequences as to an ESP (e.g., lifetime) may be taken into account.

In the method 1150, a monitor block 1152 monitors conditions associated with a well. In a decision block 1154, a decision is made as to whether an ESP speed should be adjusted, if not, the method 1150 continues at the monitor block 1152. If the decision block 1154 decides that an adjustment should be made to ESP speed, the method 1150 continues at another decision block 1156 that decides whether the prescribed adjustment may result in asphaltene precipitation. For example, information of the phase envelope 1110 may be provided as a model, data or plot (see, e.g., the model(s) 1170) and consulted to decide whether a change in ESP speed would result in a change in pressure, temperature or other condition that may give rise to precipitation of asphaltenes. If the decision block 1156 decides that no asphaltenes will precipitate, then the method 1150 continues at an adjustment block 1160 that adjusts speed of an ESP (e.g., increase or decrease). However, if the decision block 1156 decides that asphaltenes may precipitate, the method 1150 can continue at the monitor block 1152 or take other action (e.g., chemical injection to avoid precipitation). Where other action include chemical injection, given a prospective change in ESP speed and resulting change in conditions with respect to a phase envelope, the amount, type and injection points for such chemicals may be controlled to minimize or optimize chemical usage, which may be potentially detrimental to one or more components, seals, etc., of an ESP.

As mentioned, the method 1150 may include accessing one or more models 1170. In such an example, a model may be provided by a commercially available software package marketed as the dbrSOLIDS™ fluid analysis software (Schlumberger Limited, Houston, Tex.), which can predict thermodynamic precipitation point of waxes and asphaltenes based on reservoir fluid compositions information. Precipitation of wax and asphaltene is manifested primarily through changes in temperature, pressure, and composition. Composition affects both, but temperature may be more significant for wax precipitation, and pressure may be more significant for asphaltenes.

The dbrSOLIDS™ software wax (or paraffin) module includes a thermodynamic equilibrium model that predicts wax precipitation conditions. The wax module is also a complete, simultaneous two- and three-phase (vapor-liquid, liquid-solid, and vapor-liquid-solid) model. In addition to the temperature at which wax will appear, it can predict the mass of precipitated wax and other physical properties for reservoir fluids.

The dbrSOLIDS™ software asphaltene module includes a compositional thermodynamic model based on equations of state (EOS) and asphaltene molecular association and can also use a saturate-aromatic-resin-asphaltene analysis to perform asphaltene precipitation calculations.

With respect to the well evolution plot 1130, a method can include monitoring gradients of temperature, pressure or temperature and pressure with respect to distance. A change in a gradient may indicate a potential breach in a pipeline. As mentioned, a wellhead can include a temperature, pressure or other sensor.

Figure 12:
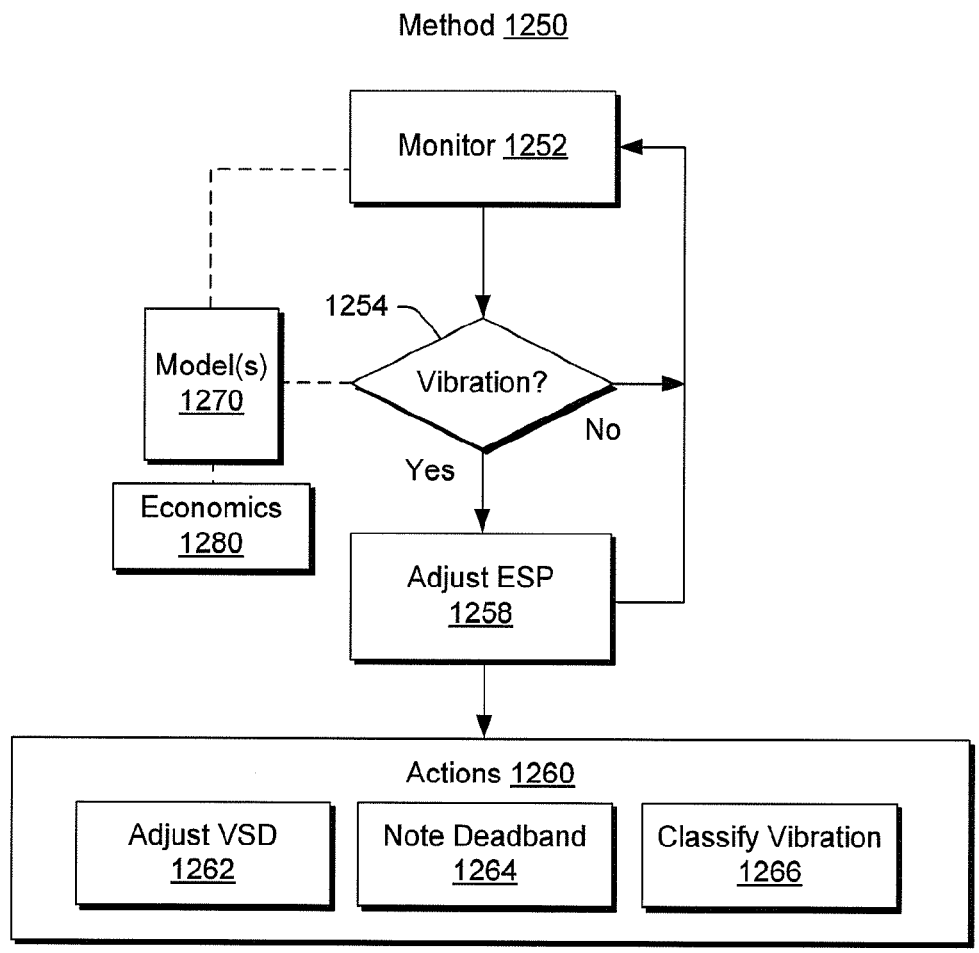
FIG. 12 illustrates an example of a method.

FIG. 12 shows an example of a method 1250 that includes a monitor block 1252 to monitor for vibration, a decision block 1254 to decide whether vibration is occurring (e.g., at a potentially detrimental level) and an adjustment block 1258 to adjust an ESP to alleviate or reduce vibration. In the example of FIG. 12, the method 1250 may include accessing one or more models 1270, which may include an economic model 1280. Further, the adjustment block 1258 may include taking one or more actions such as adjusting a VSD unit 1262, noting a deadband 1264 and classifying the vibration 1266, optionally including corrective actions that may remedy a detected type of vibration. The method 1250 can optionally include accessing deadband settings to avoid natural frequencies of an installation, which may lower vibration/resonance and its damaging consequences.

Figure 13:
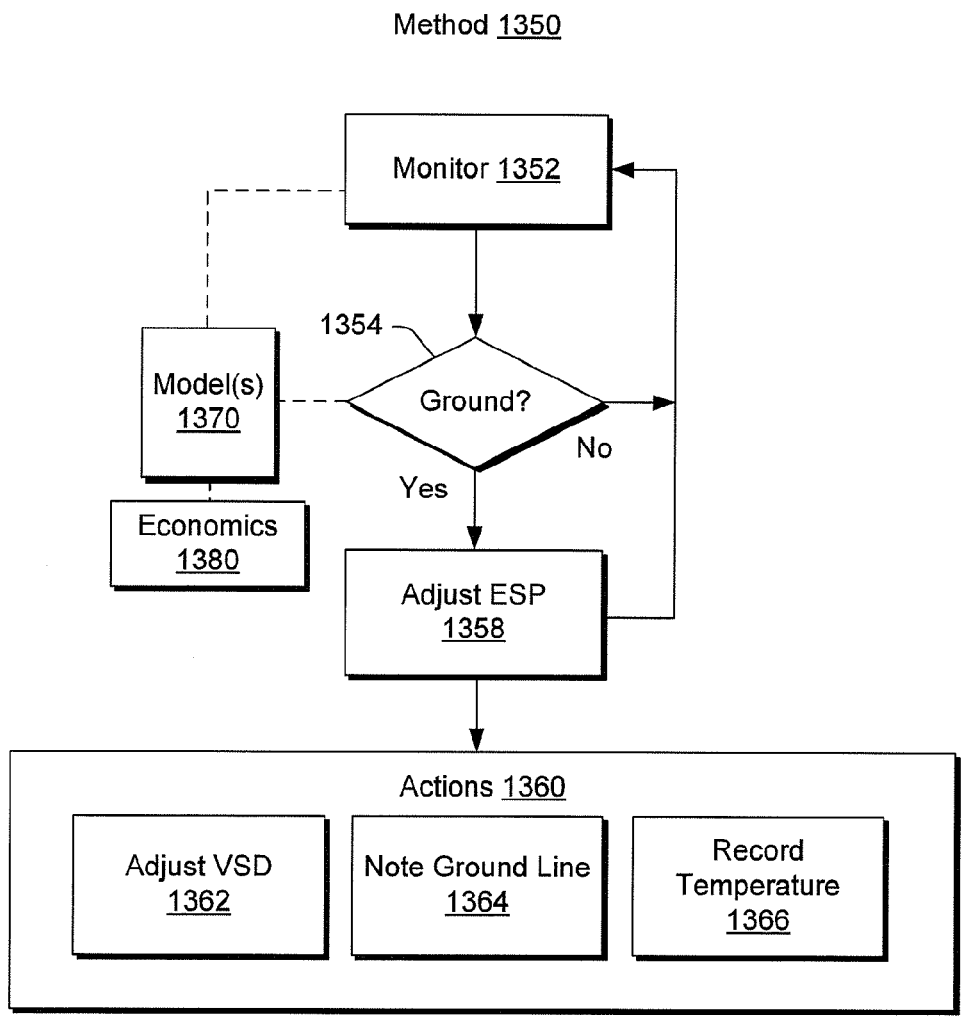
FIG. 13 illustrates an example of a method.

FIG. 13 shows an example of a method 1350 that includes a monitor block 1352 to monitor for ground issues (e.g., ground faults of one or more lines), a decision block 1354 to decide whether a ground issue is occurring (e.g., at a potentially detrimental level) and an adjustment block 1358 to adjust an ESP to alleviate or reduce risk of a ground fault. In the example of FIG. 13, the method 1350 may include accessing one or more models 1370, which may include an economic model 1380. Further, the adjustment block 1358 may include taking one or more actions such as adjusting a VSD unit 1362, noting a ground line or other line associate with a potential fault or a fault 1364 and recording temperature 1366 to determine whether an adjustment may have an impact on operational temperature of an ESP motor. In the example of FIG. 13, the monitor block 1352 may include monitoring ground fault detection via one or more downhole gauges. In the example of FIG. 13, the adjustment block 1358 may include adjusting speed (e.g., voltage adjustment) to reduce voltage stresses on remaining phases of an ESP motor.

Methods described herein may include associated computer-readable media (CRM) blocks. Such blocks can include instructions suitable for execution by one or more processors (or cores) to instruct a computing device or system to perform one or more actions.

According to an embodiment, one or more computer-readable media may include computer-executable instructions to instruct a computing system to output information for controlling a process. For example, such instructions may provide for output to sensing process, an injection process, drilling process, an extraction process, etc.

Figure 14:
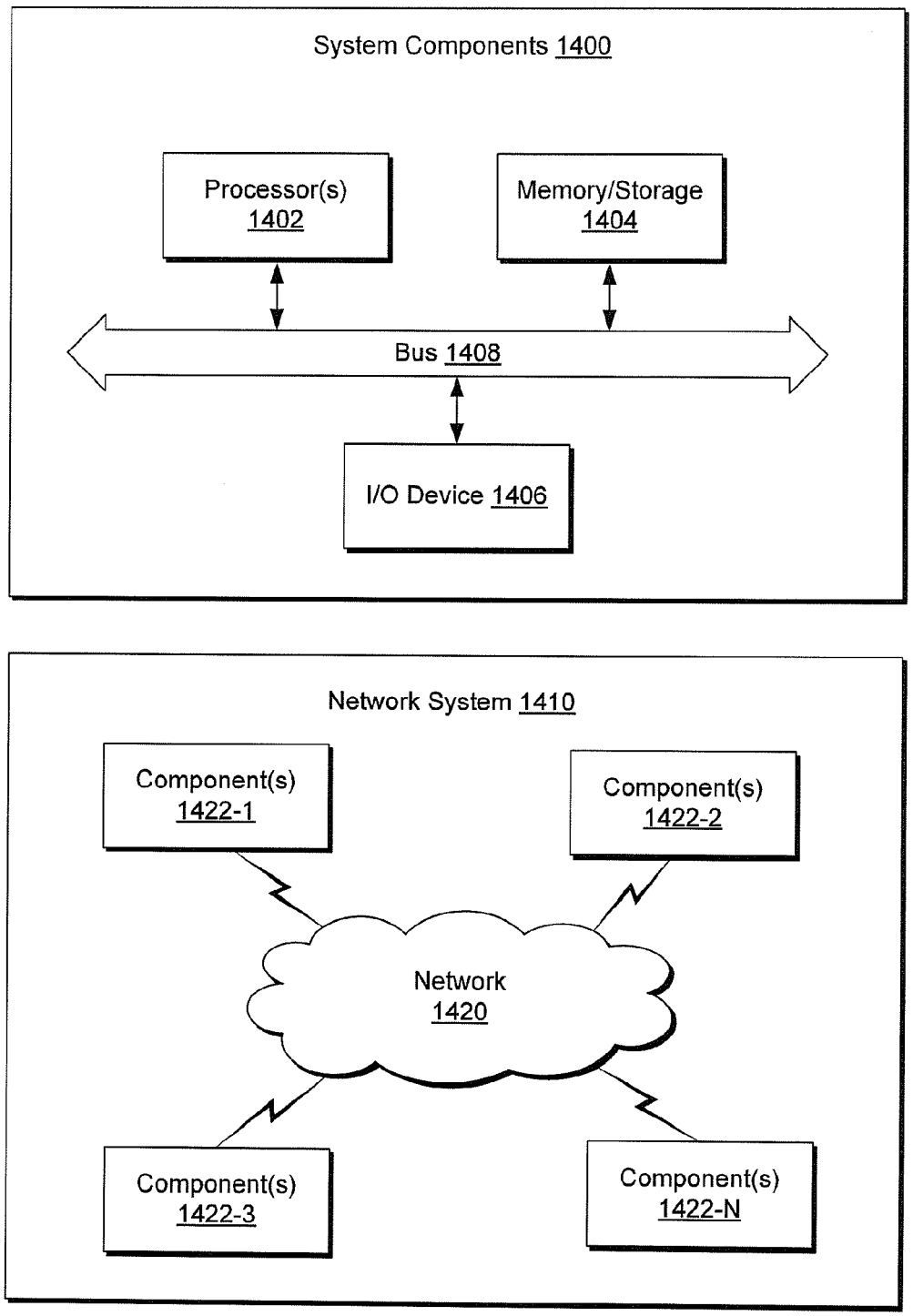
FIG. 14 illustrates example components of a system and a networked system.

FIG. 14 shows components of a computing system 1400 and a networked system 1410. The system 1400 includes one or more processors 1402, memory and/or storage components 1404, one or more input and/or output devices 1406 and a bus 1408. According to an embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. The one or more processors may execute such instructions to implement (wholly or in part) one or more attributes (e.g., as part of a method). A user may view output from and interact with a process via an I/O device (e.g., the device 1406). According to an embodiment, a computer-readable medium may be a storage component such as a physical memory storage device, for example, a chip, a chip on a package, a memory card, etc.

According to an embodiment, components may be distributed, such as in the network system 1410. The network system 1410 includes components 1422-1, 1422-2, 1422-3, . . . 1422-N. For example, the components 1422-1 may include the processor(s) 1402 while the component(s) 1422-3 may include memory accessible by the processor(s) 1402. Further, the component(s) 1402-2 may include an I/O device for display and optionally interaction with a method. The network may be or include the Internet, an intranet, a cellular network, a satellite network, etc.

CONCLUSION

Although various methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

The invention claimed is:

1. A system comprising:
   a first interface to receive sensed data and economic data;
   a production control framework that comprises
      a module for modeling motor efficiency of an electric submersible pump wherein the module for modeling motor efficiency is stored in a memory,
      a module for modeling gas composition of a fluid being pumped by an electric submersible pump wherein the module for modeling gas composition is stored in a memory, and
      a module for modeling solid dynamics in a fluid being pumped by an electric submersible pump, wherein the module for modeling solid dynamics is stored in a memory; and
      a module to update one or more of the modules for modeling in response to receipt of data via the first interface, wherein the module to update is stored in a memory; and
   a second interface to output control commands to a controller for an electric submersible pump based at least in part on data received by the first interface and analyzed via modeling by the production control framework.

2. The system of claim 1 wherein the module for modeling motor efficiency comprises a pump performance curve.

3. The system of claim 1 wherein the module for modeling gas composition comprises a phase envelope model that comprises a bubblepoint line.

4. The system of claim 1 wherein the module for modeling solid dynamics comprises a sand limit model.

5. The system of claim 1 wherein the module for modeling solid dynamics comprises an asphaltene envelope model or a wax envelope model.

6. The system of claim 1 wherein the module for modeling motor efficiency comprises an algorithm to adjust voltage while maintaining a constant frequency.

7. The system of claim 6 wherein the algorithm to adjust voltage while maintaining a constant frequency achieves a minimum current draw by a motor of an electric submersible pump.

8. The system of claim 1 wherein the economic data comprises real time market data.

9. The system of claim 8 wherein the real time market data comprises oil price data for a type of oil being pumped by an electrical submersible pump controllable by the interface to output control commands.

10. The system of claim 8 wherein the real time market data comprises electricity price data for powering an electrical submersible pump controllable by the interface to output control commands.

11. The system of claim 1 wherein the controller to control an electric submersible pump comprises a variable speed drive controller.

12. The system of claim 1 wherein the production control framework comprises an enhanced oil recovery module for modeling injection of steam into a geologic environment to assist production of oil from the geologic environment by an electric submersible pump, wherein the enhanced oil recovery module is stored in a memory.

13. The system of claim 1 wherein the production control framework comprises a chemical injection module for modeling injection of one or more chemicals that interact with asphaltenes or wax, wherein the chemical injection module is stored in a memory.

14. The system of claim 1 further comprising an electric submersible pump that comprises one or more sensors.

* * * * *